US012679678B2

(12) United States Patent  (10) Patent No.: US 12,679,678 B2
Hoofard et al.  (45) Date of Patent: Jul. 14, 2026

(54) LOADING DOCK SYSTEMS FOR DETECTING TRAILER WHEEL/SUSPENSION SYSTEM POSITIONS AND ASSOCIATED METHODS OF MANUFACTURE AND USE

(71) Applicant: ASSA ABLOY ENTRANCE SYSTEMS AB, Landskrona (SE)

(72) Inventors: Richard K. Hoofard, Dallas, TX (US); Daryl Day, Frisco, TX (US); Stephen Kosek, Fort Worth, TX (US)

(73) Assignee: ASSA ABLOY ENTRANCE SYSTEMS AB, Landskrona (SE)

( * ) Notice: Subject to any disclaimer, the term of this patent is extended or adjusted under 35 U.S.C. 154(b) by 85 days.

(21) Appl. No.: 18/463,150

(22) Filed: Sep. 7, 2023

(65) Prior Publication Data

US 2025/0083912 A1    Mar. 13, 2025

(51) Int. Cl.
B65G 69/28    (2006.01)
(52) U.S. Cl.
CPC ......... B65G 69/2882 (2013.01); B65G 69/28 (2013.01)
(58) Field of Classification Search
CPC .... B65G 69/28; B65G 69/2882; B65G 69/00; B65G 69/34; B60W 30/00; B60W 30/06; B60W 60/00; B60W 60/0015; B60T 3/00; G01S 13/86; G01S 13/931
See application file for complete search history.

(56) References Cited

U.S. PATENT DOCUMENTS

| | | | |
|---|---|---|---|
| 1,775,909 A | 9/1930 | Mikkelsen |
| 2,362,981 A | 11/1944 | Philemon |
| 2,883,182 A | 4/1959 | William |
| 2,887,865 A | 5/1959 | Moler |
| 3,051,014 A | 8/1962 | Houk |
| 3,439,728 A | 4/1969 | Martini |
| 3,630,557 A | 12/1971 | Pierce et al. |
| 3,635,277 A | 1/1972 | Bahnsen |

(Continued)

FOREIGN PATENT DOCUMENTS

| | | | |
|---|---|---|---|
| AU | 2005100075 A4 | 4/2005 |
| CA | 2963656 A1 | 11/2017 |

(Continued)

OTHER PUBLICATIONS

"Pentalift introduces industry's first solar powered dock leveler!" www.pentalift.com, Jun. 14, 2011, 1 page.

(Continued)

*Primary Examiner* — Van T Trieu
(74) *Attorney, Agent, or Firm* — Perkins Coie LLP

(57) ABSTRACT

Loading dock systems and associated methods for detecting the position of trailer rear wheel assembly/rear suspension system relative to a corresponding trailer bed and/or loading dock face are described herein. In some embodiments, a loading dock station can include one or more sensors for detecting whether a rear wheel assembly (e.g., a movable rear wheel assembly) of a trailer is in a rear position relative to the trailer bed when the trailer is present at the loading dock station. In some embodiments, the systems and methods disclosed herein can control subsequent operation of loading dock equipment based on the determined position of the rear wheel assembly.

20 Claims, 7 Drawing Sheets

(56) References Cited

U.S. PATENT DOCUMENTS

| | | | |
|---|---|---|---|
| 3,813,119 A | 5/1974 | Panici |
| 3,894,571 A | 7/1975 | Hinchliff |
| 4,009,051 A | 2/1977 | Kazis et al. |
| 4,010,571 A | 3/1977 | Mcguire et al. |
| 4,147,073 A | 4/1979 | Mercier |
| 4,286,911 A | 9/1981 | Benjamin |
| 4,476,853 A | 10/1984 | Arbogast |
| 4,590,118 A | 5/1986 | Yatabe et al. |
| 4,625,456 A | 12/1986 | Lafontaine |
| 4,626,983 A | 12/1986 | Harada et al. |
| 4,661,758 A | 4/1987 | Whittaker |
| 4,744,121 A | 5/1988 | Swessel et al. |
| 4,821,456 A | 4/1989 | Nogaki |
| 4,843,373 A | 6/1989 | Trickle et al. |
| 4,860,813 A | 8/1989 | Ballyns et al. |
| 4,878,529 A | 11/1989 | Hormann |
| 4,936,731 A | 6/1990 | Noble |
| 4,988,254 A | 1/1991 | Alexander |
| 5,026,242 A | 6/1991 | Alexander |
| 5,047,748 A | 9/1991 | Trickle |
| 5,056,847 A | 10/1991 | Stillwell et al. |
| 5,085,094 A | 2/1992 | Clawson et al. |
| 5,168,262 A | 12/1992 | Okayama |
| 5,168,267 A | 12/1992 | Trickle |
| 5,181,401 A | 1/1993 | Hodan |
| 5,196,965 A | 3/1993 | Lang et al. |
| 5,277,240 A | 1/1994 | Epema et al. |
| 5,323,098 A | 6/1994 | Hamaguchi et al. |
| 5,403,142 A | 4/1995 | Stewart |
| 5,495,102 A | 2/1996 | Fine |
| 5,544,924 A | 8/1996 | Paster |
| 5,565,843 A | 10/1996 | Meyvis |
| 5,576,533 A | 11/1996 | Tantraporn |
| 5,775,107 A | 7/1998 | Sparkman |
| 5,831,540 A | 11/1998 | Sullivan et al. |
| 5,886,863 A | 3/1999 | Nagasaki et al. |
| 5,886,883 A | 3/1999 | Rail |
| 5,898,585 A | 4/1999 | Sirichote et al. |
| 5,915,446 A | 6/1999 | De Zen |
| 6,082,952 A | 7/2000 | Alexander |
| 6,125,582 A | 10/2000 | Mondragon et al. |
| 6,134,835 A | 10/2000 | Krupke et al. |
| 6,179,036 B1 | 1/2001 | Harvey |
| 6,276,744 B1 | 8/2001 | Huber et al. |
| 6,367,259 B1 | 4/2002 | Timm |
| 6,369,462 B1 | 4/2002 | Siri |
| 6,390,245 B1 | 5/2002 | Metz |
| 6,442,897 B1 | 9/2002 | Mullet |
| 6,476,572 B2 | 11/2002 | Lounsbury |
| 6,523,823 B1 | 2/2003 | Bakoledis |
| 6,543,375 B1 | 4/2003 | Sargent et al. |
| 6,663,527 B2 | 12/2003 | Phelan et al. |
| 6,781,516 B2 | 8/2004 | Reynard et al. |
| 6,787,259 B2 | 9/2004 | Colborn et al. |
| 6,810,817 B1 | 11/2004 | James |
| 6,812,849 B1 | 11/2004 | Ancel |
| 6,917,298 B2 | 7/2005 | Romano et al. |
| 6,972,226 B2 | 12/2005 | Deppe et al. |
| 6,975,226 B2 | 12/2005 | Reynard et al. |
| 7,032,720 B2 | 4/2006 | Jette et al. |
| 7,045,764 B2 | 5/2006 | Beggs et al. |
| 7,119,673 B2 | 10/2006 | Eager et al. |
| 7,162,762 B1 | 1/2007 | Gleason |
| 7,165,486 B2 | 1/2007 | Alexander et al. |
| 7,230,819 B2 | 6/2007 | Muchow et al. |
| 7,254,868 B2 | 8/2007 | Mullet et al. |
| 7,256,703 B2 | 8/2007 | Duvernell et al. |
| 7,264,092 B2 | 9/2007 | Jette |
| 7,274,300 B2 | 9/2007 | Duvernell et al. |
| 7,327,107 B2 | 2/2008 | Mullet et al. |
| 7,333,016 B2 | 2/2008 | Ancel |
| 7,380,375 B2 | 6/2008 | Maly |
| 7,686,061 B2 | 3/2010 | Mullet et al. |
| 7,730,981 B2 | 6/2010 | Mccabe et al. |
| 7,750,890 B2 | 7/2010 | Fitzgibbon et al. |
| 7,864,030 B2 | 1/2011 | Jette |
| 7,956,718 B2 | 6/2011 | Murphy et al. |
| 8,058,970 B2 | 11/2011 | Mullet et al. |
| 8,065,770 B2 | 11/2011 | Proffitt et al. |
| 8,112,949 B2 | 2/2012 | Eungard |
| 8,181,401 B2 | 5/2012 | Eungard |
| 8,286,757 B2 | 10/2012 | Nelson |
| 8,307,589 B2 | 11/2012 | Eungard |
| 8,307,956 B2 | 11/2012 | Andersen et al. |
| 8,345,010 B2 | 1/2013 | Fitzgibbon et al. |
| 8,364,334 B2 | 1/2013 | Au et al. |
| 8,407,842 B2 | 4/2013 | Story et al. |
| 8,410,895 B2 | 4/2013 | Murphy et al. |
| 8,421,611 B1 | 4/2013 | Coshow et al. |
| 8,490,669 B2 | 7/2013 | Fletcher et al. |
| 8,497,761 B2 | 7/2013 | Mcneill et al. |
| 8,510,888 B2 | 8/2013 | Eungard |
| 8,528,622 B2 | 9/2013 | Ehrlich |
| 8,547,234 B2 | 10/2013 | Maly et al. |
| 8,590,087 B2 | 11/2013 | Swessel et al. |
| 8,590,674 B2 | 11/2013 | Jette |
| 8,775,710 B1 | 7/2014 | Miller et al. |
| 8,893,764 B2 | 11/2014 | Mascari et al. |
| 8,959,838 B1 | 2/2015 | Marinelli |
| 8,976,006 B2 | 3/2015 | Krupke et al. |
| 8,978,562 B2 | 3/2015 | Nagamine et al. |
| 9,211,889 B1 | 12/2015 | Hoetzer et al. |
| 9,230,419 B2 | 1/2016 | Beggs et al. |
| 9,234,377 B2 | 1/2016 | Schatz et al. |
| 9,274,522 B2 | 3/2016 | Boos et al. |
| 9,283,935 B2 | 3/2016 | Fujioka |
| 9,487,984 B2 | 11/2016 | Wachtell et al. |
| 9,517,902 B2 | 12/2016 | Harrington |
| 9,564,072 B2 | 2/2017 | Senfleben et al. |
| 9,623,859 B2 | 4/2017 | Lavoie et al. |
| 9,633,537 B2 | 4/2017 | Beggs et al. |
| 9,656,691 B2 | 5/2017 | Heimberger et al. |
| 9,751,702 B1 * | 9/2017 | Hoofard .................. B60T 3/00 |
| 9,771,225 B2 | 9/2017 | Stone et al. |
| 9,776,511 B2 | 10/2017 | Brooks et al. |
| 9,777,529 B2 | 10/2017 | Mcneill et al. |
| 9,926,148 B2 | 3/2018 | Hochstein et al. |
| 9,957,121 B2 | 5/2018 | Sveum et al. |
| 10,032,380 B2 | 7/2018 | Mushynski et al. |
| 10,053,904 B2 | 8/2018 | Mcneill et al. |
| 10,081,504 B2 | 9/2018 | Walford et al. |
| 10,096,187 B2 | 10/2018 | Deneen et al. |
| 10,106,342 B2 | 10/2018 | Avalos |
| 10,113,352 B2 | 10/2018 | Mcneill et al. |
| 10,227,190 B2 | 3/2019 | Brooks et al. |
| 10,332,058 B1 | 6/2019 | Kandregula et al. |
| 10,358,858 B2 | 7/2019 | Lietz et al. |
| 10,435,936 B2 | 10/2019 | Lietz et al. |
| 10,444,965 B2 | 10/2019 | Daley et al. |
| 10,494,205 B1 | 12/2019 | Hoofard et al. |
| 10,829,970 B2 | 11/2020 | Ehrlich et al. |
| 10,878,386 B2 | 12/2020 | Hoofard et al. |
| 10,947,069 B2 | 3/2021 | Brooks et al. |
| 11,124,372 B2 | 9/2021 | Hoofard et al. |
| 11,142,413 B2 | 10/2021 | Hoofard et al. |
| 11,225,402 B1 | 1/2022 | Stokes |
| 11,225,824 B2 | 1/2022 | Hoofard et al. |
| 11,256,264 B2 | 2/2022 | Hoofard et al. |
| 11,262,747 B2 | 3/2022 | Hoofard et al. |
| 11,305,953 B2 | 4/2022 | Hoofard et al. |
| 11,358,813 B2 | 6/2022 | Walford et al. |
| 11,392,141 B2 | 7/2022 | Dinh |
| 11,507,926 B2 | 11/2022 | Hoofard et al. |
| 11,548,743 B2 | 1/2023 | Hoofard et al. |
| 11,668,131 B2 | 6/2023 | Mcneill et al. |
| 11,834,014 B2 | 12/2023 | Yu et al. |
| 11,919,343 B2 | 3/2024 | Mckibben et al. |
| 2001/0035667 A1 | 11/2001 | Gaeta |
| 2002/0089427 A1 | 7/2002 | Aratani et al. |
| 2002/0130065 A1 | 9/2002 | Bloom |
| 2003/0167238 A1 | 9/2003 | Zeif et al. |
| 2004/0146384 A1 | 7/2004 | Whelan |
| 2004/0182619 A1 | 9/2004 | Mcgregor et al. |
| 2005/0050438 A1 | 3/2005 | Cheung et al. |

(56) References Cited

U.S. PATENT DOCUMENTS

| | | |
|---|---|---|
| 2005/0102041 A1 | 5/2005 | Duvernell et al. |
| 2005/0102042 A1 | 5/2005 | Reynard et al. |
| 2005/0126081 A1 | 6/2005 | Patel et al. |
| 2005/0261789 A1 | 11/2005 | Chen |
| 2005/0262549 A1 | 11/2005 | Ritt et al. |
| 2006/0099965 A1 | 5/2006 | Aaron |
| 2006/0119132 A1 | 6/2006 | Rivers et al. |
| 2006/0137261 A1 | 6/2006 | Maly |
| 2006/0145853 A1 | 7/2006 | Richards et al. |
| 2006/0158752 A1 | 7/2006 | Perkes |
| 2006/0181391 A1 | 8/2006 | Mcneill et al. |
| 2006/0235737 A1 | 10/2006 | Fleurant et al. |
| 2006/0289128 A1 | 12/2006 | Ressel et al. |
| 2007/0062422 A1 | 3/2007 | Wotring |
| 2007/0157614 A1 | 7/2007 | Goldman |
| 2007/0256797 A1 | 11/2007 | Orton et al. |
| 2007/0258798 A1 | 11/2007 | Foster et al. |
| 2007/0283806 A1 | 12/2007 | Morrison |
| 2008/0011799 A1 | 1/2008 | Chang |
| 2008/0018438 A1 | 1/2008 | Ehrlich et al. |
| 2008/0022596 A1 | 1/2008 | Boerger et al. |
| 2008/0124203 A1 | 5/2008 | Mcdonald |
| 2008/0127435 A1 | 6/2008 | Maly et al. |
| 2008/0143290 A1 | 6/2008 | Chavakula |
| 2009/0013497 A1 | 1/2009 | Squyres et al. |
| 2009/0024979 A1 | 1/2009 | Chessell et al. |
| 2009/0044191 A1 | 2/2009 | Chai et al. |
| 2009/0093688 A1 | 4/2009 | Mathur |
| 2009/0267744 A1 | 10/2009 | Penot |
| 2010/0073197 A1 | 3/2010 | Eagleton et al. |
| 2010/0146719 A1* | 6/2010 | Swessel ............ B65G 69/2882 |
| | | 14/71.3 |
| 2010/0289623 A1 | 11/2010 | Roesner |
| 2011/0075441 A1 | 3/2011 | Swessel et al. |
| 2011/0203059 A1 | 8/2011 | Whitley et al. |
| 2011/0301800 A1 | 12/2011 | Furuno et al. |
| 2011/0313893 A1 | 12/2011 | Weik, III |
| 2012/0025964 A1 | 2/2012 | Beggs et al. |
| 2012/0125545 A1 | 5/2012 | Ehrlich |
| 2012/0304558 A1 | 12/2012 | Iglesias et al. |
| 2013/0024334 A1 | 1/2013 | Kozlay |
| 2013/0038731 A1 | 2/2013 | Brey et al. |
| 2013/0059603 A1 | 3/2013 | Guenec et al. |
| 2013/0117078 A1 | 5/2013 | Weik et al. |
| 2013/0134938 A1 | 5/2013 | Bianco |
| 2013/0188050 A1 | 7/2013 | Winget |
| 2013/0261958 A1 | 10/2013 | Herron |
| 2013/0312205 A1 | 11/2013 | Riviere et al. |
| 2013/0327914 A1 | 12/2013 | Mcneill et al. |
| 2013/0332217 A1 | 12/2013 | Mcneill et al. |
| 2014/0070767 A1 | 3/2014 | Morris et al. |
| 2014/0075842 A1 | 3/2014 | Mcneill et al. |
| 2014/0137447 A1 | 5/2014 | Mama |
| 2014/0222971 A1 | 8/2014 | Cooper et al. |
| 2014/0225509 A1 | 8/2014 | Wiegel et al. |
| 2014/0247347 A1 | 9/2014 | Mcneill et al. |
| 2014/0251556 A1 | 9/2014 | Orton |
| 2015/0009046 A1 | 1/2015 | Senfleben et al. |
| 2015/0013083 A1 | 1/2015 | Palmersheim |
| 2015/0039552 A1 | 2/2015 | Moyne |
| 2015/0047132 A1 | 2/2015 | Sveum et al. |
| 2015/0047133 A1 | 2/2015 | Sveum |
| 2015/0294166 A1 | 10/2015 | Kuehnle et al. |
| 2015/0308175 A1 | 10/2015 | Wachtell et al. |
| 2016/0031482 A1 | 2/2016 | Lavoie |
| 2016/0075526 A1 | 3/2016 | Avalos |
| 2016/0090072 A1 | 3/2016 | Eppley et al. |
| 2016/0104364 A1 | 4/2016 | Brooks et al. |
| 2016/0178382 A1 | 6/2016 | Penna et al. |
| 2016/0288833 A1 | 10/2016 | Heimberger et al. |
| 2016/0362135 A1 | 12/2016 | Xu et al. |
| 2016/0368489 A1 | 12/2016 | Aich et al. |
| 2016/0369619 A1 | 12/2016 | Parmeshwar et al. |
| 2017/0008498 A1* | 1/2017 | Metz ........................ B64F 1/16 |
| 2017/0017392 A1 | 1/2017 | Castaneda et al. |
| 2017/0043967 A1 | 2/2017 | Walford et al. |
| 2017/0044817 A1 | 2/2017 | Mcneill et al. |
| 2017/0073005 A1 | 3/2017 | Jawad et al. |
| 2017/0106794 A1 | 4/2017 | Constantine |
| 2017/0120734 A1 | 5/2017 | Westerdale |
| 2017/0168501 A1 | 6/2017 | Aoki et al. |
| 2017/0174209 A1 | 6/2017 | Lavoie |
| 2017/0205824 A1 | 7/2017 | Nordbruch et al. |
| 2017/0213404 A1 | 7/2017 | Sivalingam et al. |
| 2017/0320685 A1 | 11/2017 | Hoofard et al. |
| 2018/0035606 A1 | 2/2018 | Burdoucci |
| 2018/0278897 A1 | 9/2018 | Seaman et al. |
| 2018/0346029 A1 | 12/2018 | Kabos et al. |
| 2019/0002216 A1 | 1/2019 | Walford et al. |
| 2019/0039425 A1 | 2/2019 | Dodd et al. |
| 2019/0056736 A1 | 2/2019 | Wood et al. |
| 2019/0064835 A1 | 2/2019 | Hoofard et al. |
| 2019/0144218 A1 | 5/2019 | Hoofard et al. |
| 2019/0187716 A1 | 6/2019 | Cantrell et al. |
| 2019/0197318 A1 | 6/2019 | Krishnamurthy et al. |
| 2019/0202646 A1 | 7/2019 | Brooks et al. |
| 2019/0226239 A1 | 7/2019 | Trentham et al. |
| 2019/0301224 A1 | 10/2019 | Barton |
| 2019/0302764 A1 | 10/2019 | Smith et al. |
| 2019/0316403 A1 | 10/2019 | Aiello |
| 2019/0392402 A1 | 12/2019 | Vandergon et al. |
| 2020/0002993 A1 | 1/2020 | Thouin |
| 2020/0018110 A1 | 1/2020 | Lindley et al. |
| 2020/0087970 A1 | 3/2020 | Nielson et al. |
| 2020/0115948 A1 | 4/2020 | Lietz et al. |
| 2020/0125074 A1 | 4/2020 | Ramos et al. |
| 2020/0133259 A1 | 4/2020 | Van Wiemeersch et al. |
| 2020/0180881 A1 | 6/2020 | Hoofard et al. |
| 2020/0239242 A1 | 7/2020 | Hoofard et al. |
| 2020/0273133 A1 | 8/2020 | Morris |
| 2020/0290587 A1 | 9/2020 | Duffy et al. |
| 2020/0334631 A1 | 10/2020 | Conlon |
| 2020/0361326 A1 | 11/2020 | Krucinski et al. |
| 2020/0393828 A1 | 12/2020 | Hoofard et al. |
| 2021/0079710 A1 | 3/2021 | Evans et al. |
| 2021/0082220 A1 | 3/2021 | Boerger et al. |
| 2021/0238908 A1 | 8/2021 | Ramage et al. |
| 2022/0146269 A1 | 5/2022 | Hoofard et al. |
| 2022/0170311 A1 | 6/2022 | Mcneill et al. |
| 2022/0243524 A1 | 8/2022 | Hoofard et al. |
| 2022/0306410 A1 | 9/2022 | Hoofard et al. |
| 2022/0338719 A1 | 10/2022 | Walford et al. |
| 2022/0349715 A1 | 11/2022 | Park |
| 2022/0388380 A1 | 12/2022 | Hoofard et al. |
| 2023/0003074 A1 | 1/2023 | Hoofard et al. |
| 2023/0092724 A1 | 3/2023 | Parsons |
| 2024/0051521 A1* | 2/2024 | James ................... B60W 30/06 |
| 2024/0391713 A1* | 11/2024 | Hoofard ............ B65G 69/2864 |

FOREIGN PATENT DOCUMENTS

| | | |
|---|---|---|
| CA | 2967275 A1 | 12/2017 |
| CA | 3067610 A1 | 7/2020 |
| CN | 2075169 U | 4/1991 |
| CN | 101716959 A | 6/2010 |
| CN | 103485613 B | 6/2015 |
| CN | 209087157 U | 7/2019 |
| DE | 19836432 A1 | 3/1999 |
| DE | 202005008059 U1 | 11/2005 |
| DE | 102004037933 B3 | 2/2006 |
| DE | 202004016760 U1 | 3/2006 |
| DE | 102006014153 A1 | 10/2007 |
| DE | 202013008638 U1 | 11/2013 |
| EP | 0729856 A1 | 9/1996 |
| EP | 2215612 B1 | 8/2012 |
| EP | 2660170 A1 | 11/2013 |
| EP | 2692561 A1 | 2/2014 |
| FR | 933292 A | 4/1948 |
| FR | 2797246 A1 | 2/2001 |
| FR | 2869470 A1 | 10/2005 |
| GB | 1527046 A | 10/1978 |
| NL | 8902808 A | 6/1991 |
| WO | 2005045169 A1 | 5/2005 |
| WO | 2006066013 A2 | 6/2006 |

(56) References Cited

FOREIGN PATENT DOCUMENTS

| WO | 2006076538 A2 | 7/2006 |
|----|---------------|--------|
| WO | 2008014026 A1 | 1/2008 |
| WO | 2008014206 A1 | 1/2008 |
| WO | 2008036087 A1 | 3/2008 |
| WO | 2009070509 A1 | 6/2009 |
| WO | 2010077977 A1 | 7/2010 |
| WO | 2011037839 A1 | 3/2011 |
| WO | 2014125040 A1 | 8/2014 |
| WO | 2015023666 A1 | 2/2015 |
| WO | 2015023669 A1 | 2/2015 |
| WO | 2015084167 A1 | 6/2015 |
| WO | 2015166339 A1 | 11/2015 |
| WO | 2016007321 A1 | 1/2016 |
| WO | 2016209141 A1 | 12/2016 |
| WO | 2017100716 A1 | 6/2017 |
| WO | 2019090199 A1 | 5/2019 |
| WO | 2019173811 A2 | 9/2019 |
| WO | 2019209773 A1 | 10/2019 |
| WO | 2020156936 A1 | 8/2020 |

OTHER PUBLICATIONS

APS&GO—LED Communication System Specification Sheet, APS Resource, for APS1102, Nov. 2009, 2 pages.
Bin et al., Constrained Model Predictive Control for Backing-up Tractor-Trailer System, Proceeding of the 10th World Congress on Intelligent Control and Automation, Jul. 6-8, 2012, Beijing, China, pp. 2165-2170.
Desantis et al., Path-Tracking for Tractor-Trailers with Hitching of Both the On-Axle and the Off-Axle Kind, Proceedings of the 2002 IEEE International Symposium on Intelligent Control, 2002.
Energy Saving Products Brochure, APS Resource, Mar. 2009, 4 pages.
FT Ultra LED Flex Arm Docklight Specification Sheet, APS Resource, Form APS 1168, Nov. 2009, 2 pages.
Fuchs C et al: "3D pose estimation for articulated vehicles using Kalman-filter based tracking", Pattern Ricognition. Image Analysis, Allen Press, Lawrence, KS, US, vol. 26, No. 1, Jul. 23, 2016 (Jul. 23, 2016), pp. 109-113.
Hamid et al. "Implementation of Intelligent Automated Gate System with QR Code," International Journal of Advanced Computer Science and Applications 9. 10 (2018) (Year: 2018); 6 pages.
High Impact LED Dock Light Specification Sheet, APS Resource, Form APS1171, Nov. 2009, 2 pages.
Kelley Company; Vehicle Restraints brochure; 2008 ; 8 pages.
Manual and Automatic Light Communication Systems, User's Manual, Serco, Oct. 2009, 28 pages.
Mcgovern et al., An Articulated Truck on a Spreadsheet, Level 3, Issue 1, Nov. 2003, 23 pages.
Model G307K2 Kadet 2 Operator Interface with 7" TFT Display, Red Lion Controls, Inc., Nov. 23, 2015, 4 pages.
Oreh et al., A New Method for Directional Control of a Tractor Semi-Trailer, Australian Journal of Basic and Applied Sciences, 6(12): 369-409, 2012.
Safety & Lighting Products Brochure, APS Resource, Sep. 2004, 2 pages.
Serco Vehicle Restraints brochure; 2008; 4 pages.
Serco; Loading Dock Solutions brochure; 2008; 8 pages.
Smart Power Systems International GmbH, Web pages for Hybrid DC/AC Power Supply, Jun. 1, 2004.
Tofael Ahamed: "Navigation of an Autonomous Tractor Using Multiple Sensors", Thesis, Feb. 22, 2008 (Feb. 22, 2008), XP055527539, retrieved from the Internet: URL: https ://tsukuba.repo.nii.ac,jp, [retrieved on Nov. 27, 2018], Chapter 9.
International Search Report and Written Opinion of International Application No. PCT/EP2024/075038; Date of Mailing: Nov. 27, 2024; 30 pages.
Search Report for Swedish Application No. 2330555-0; Date of Mailing: Jun. 19, 2024; 9 pages.

* cited by examiner

LOADING DOCK SYSTEMS FOR DETECTING TRAILER WHEEL/SUSPENSION SYSTEM POSITIONS AND ASSOCIATED METHODS OF MANUFACTURE AND USE

TECHNICAL FIELD

The present disclosure is generally related to systems and associated methods for detecting trailer wheel and/or trailer suspension system positions at loading docks.

BACKGROUND

Loading docks typically include an area for cargo vehicles (e.g., trucks, trailers, etc.) to back up next to an elevated platform of a building so that cargo can be transferred between the vehicle and the building. Some loading docks include equipment to facilitate cargo transfer operations, such as dock levelers, vehicle restraints, etc. Dock levelers provide an adjustable bridge between the platform and a cargo bed of the vehicle. To prevent the vehicle from prematurely moving away from the platform, vehicle restraints are typically employed to engage a rear impact guard (RIG) of the truck or trailer, a wheel, or some other feature of the vehicle.

Some over-the-road (OTR) trailers include air ride suspension systems. Examples of such systems are disclosed in U.S. Pat. Nos. 3,140,880; 4,379,572; and 4,415,179; and U.S. patent application Ser. No. 17/814,633; each of which is incorporated herein by reference in its entirety. Some OTR trailers also include sliding suspension systems. Examples of such systems are disclosed in U.S. Pat. Nos. 5,346,233; 5,378,006; and 11,597,246; and U.S. patent application Ser. No. 17/814,633; each of which is incorporated herein by reference in its entirety. Air ride suspension systems can include air springs comprised of air bags. The use of air ride suspension systems on trucks, tractors, and trailers equipped with spring or walking beam suspensions can reduce road shocks transmitted through the tires, axles and suspension into the vehicle body; smooth out uneven road conditions; significantly reduce axle hop, bogie chatter and cargo damage; and provide air ride performance from the spring suspension. In such systems air is typically supplied to the air bags at a constant pressure from a vehicle air system. The pressure of the air supplied to the bags is typically manually controlled by the vehicle operator (e.g., the driver). Generally, a low pressure is used for a vehicle in an unloaded condition and a high pressure is used for a vehicle in a loaded condition. In most instances, the air in the air bags is dumped or vented during cargo loading/unloading operations to reduce vertical movement of the trailer during those operations.

To accommodate various weight regulations, many semi-trailers include rear wheel assemblies with multiple rear axles/wheels (e.g., two rear axles and associated wheels; which can be referred to as a "wheeled tandem") affixed to a carriage that is slidably adjustable along tracks (e.g., frame rails) on the trailer and retained in position by pins inserted into apertures on the tracks. Such rear wheel assemblies typically include a suspension system (including, e.g., air bags, leaf and/or coil springs, etc.), axles, wheels, brakes, tires, and mud flaps. The sliding carriage enables the wheel assembly to be moved to a forward position relative to the trailer for, e.g., maneuverability when travelling over the road, and to a rear position for cargo loading/unloading operations. The position of the sliding carriage is typically adjusted by the operator, via a hand activated lever or mechanism that removes the pins, thus freeing the carriage to be adjusted (e.g., moved fore or aft) relative to the trailer bed. After the pins are removed, the rear wheel assembly is locked into place by the application of the wheel brakes. The trailer bed is then moved by driving the vehicle cab forward or aft as appropriate to slide the trailer bed in the desired direction over the locked rear wheel assembly. Once the rear wheel assembly is in the desired position relative to the trailer bed, the pins are reinserted by hand back into a different pair of apertures to lock the carriage in position relative to the trailer bed.

Common practice in the industry is to have the vehicle operator dump the air in the air springs and move the rear wheel assembly to the rear position relative to the trailer bed before approaching a loading dock. This is done to achieve a stable and safe platform for loading and unloading operations. Failure to do so can result in excessive and potentially unsafe vertical movement of the trailer during the loading/unloading operations as weight is shifted onto and off the trailer. For example, when the rear wheel assembly is in the full forward position and the air springs are fully charged, this creates a cantilevered configuration for the rear of the trailer that, in combination with the resilience of the charged air springs, creates the potential for excessive vertical bounce when weight is shifted onto or off the trailer bed. This condition can be improved slightly, even if the air springs remain fully charged, by moving the rear wheel assembly to the rearmost position, as this eliminates the cumulative effect of the cantilever configuration in combination with the spring action of the charged air springs.

DETAILED DESCRIPTION

Figures 1A, 1B:
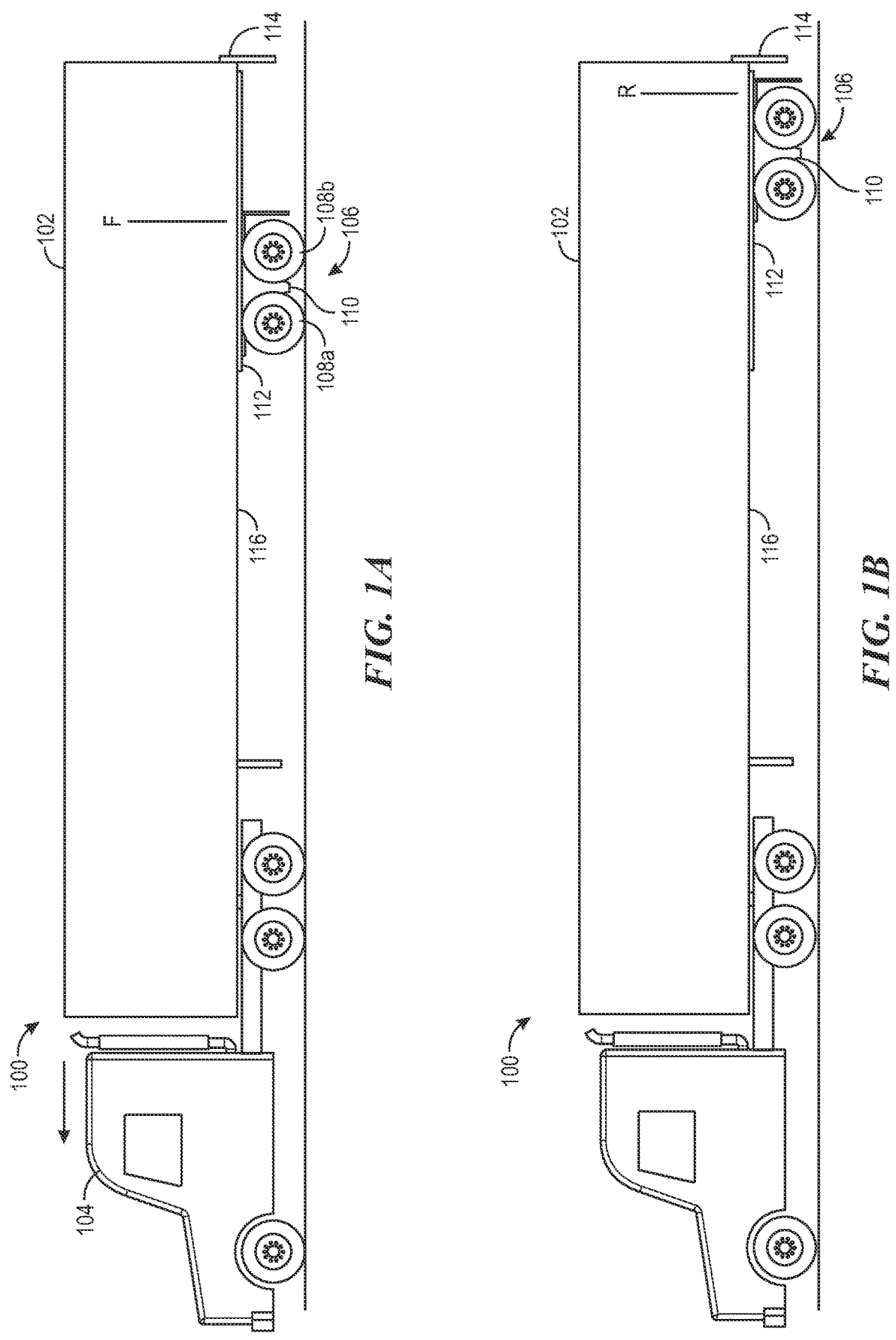
FIGS. 1A and 1B are side views of a transport vehicle having a rear wheel assembly in a forward position and a rear position, respectively, in accordance with embodiments of the present technology.

The following disclosure describes various embodiments of systems and methods for detecting the position of a rear wheel assembly and/or an associated rear suspension system of a cargo vehicle (e.g., a cargo trailer) at a loading dock. For example, in some embodiments, the systems and methods described herein can be used to confirm that the rear wheel assembly is in a rear, or rearmost, position prior to proceeding with cargo loading and/or unloading operations at the loading dock. During normal loading/unloading operations at a loading dock, it is generally recommended that the trailer operator have the rear wheel assembly moved all the way to a rear position relative to the trailer bed and all the air dumped from the air springs (assuming the trailer has an air ride suspension system). Taking these steps can help stabilize the trailer bed for cargo loading/unloading operations at the loading dock. In some instances, however, trailer operators may fail to take these steps before approaching the loading dock and instead leave the rear wheels in a forward position (with the air springs fully charged), which is typically the best configuration for maneuvering a loaded trailer over the road. As a result, the aft end of the trailer bed may be substantially cantilevered from the rear suspension, which can lead to an undesirable amount of vertical movement of the trailer bed as weight is added to, or removed from, the trailer bed (for example, when a forklift moves into and out of the trailer during loading/unloading operations).

As described in greater detail below, in some embodiments the present technology can prevent, or at least inhibit, cargo loading/unloading operations if the rear trailer wheels (and hence the rear suspension) are not in a suitable rearward position (e.g., a rearmost position) relative to the trailer bed when the trailer is present at the loading dock. For example, in some embodiments the technology described herein can include a sensor system of one or more sensors located on or near the exterior of a loading dock and configured to detect the position of a rear wheel, mud flap, suspension component, and/or other component of a rear wheel assembly of a transport trailer located at the dock for loading/unloading operations. In some embodiments, the sensor system can communicate with a loading dock control system (including, e.g., a loading dock control panel and/or a central loading dock management system, etc.) that prevents the operation of loading dock equipment (e.g., a vehicle restraint, a dock door, and/or a dock leveler, etc.) unless the sensor system detects that the rear wheels are positioned in, or at least within a preset distance of, the rearmost position.

Certain details are set forth in the following description and in FIGS. 1A-6 to provide a thorough understanding of various embodiments of the present technology. In other instances, well-known structures, materials, operations and/or systems often associated with over-the-road trailers, semi-trailer wheel assemblies and suspension systems, proximity sensors, position sensors, loading docks and associated equipment, etc., are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the present technology. Moreover, many of the details, dimensions, angles and other features shown in the Figures are merely illustrative of particular embodiments of the present technology. Accordingly, other embodiments can have other details, dimensions, angles and features without departing from the spirit or scope of the present disclosure. In addition, those of ordinary skill in the art will appreciate that further embodiments of the present technology can be practiced without several of the details described below. In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1A.

FIGS. 1A and 1B are side views of a transport vehicle 100 having a trailer 102 operably coupled to a tractor 104. In some embodiments, the tractor 104 can be a conventional tractor and the trailer 102 can be a conventional over-the-road trailer (e.g., a semi-trailer) having a rear wheel assembly 106 (which can also be referred to as an "undercarriage" or "bogie") that includes multiple axles having corresponding wheels mounted on opposite end portions thereof in a conventional manner. For example, in the illustrated embodiment the rear wheel assembly 106 includes two tandem axles carrying corresponding wheels 108a, 108b and can be referred to as a "wheeled tandem." The rear wheel assembly 106 further includes a rear suspension system 110 that operably couples the tandem axles to the underside of a trailer chassis 116. In some embodiments, the rear suspension system 110 can be a conventional rear suspension system that is slidably mounted to a track portion 112 (e.g., two parallel frame rails) of the trailer chassis 116 via a carriage (not shown). Additionally, in some embodiments the rear suspension system 110 can be a conventional air ride suspension having, e.g., air bags/air springs that can be inflated or deflated to accommodate different trailer loading conditions. In other embodiments, the rear suspension system 110 can include additional or other types of suspension components including leaf springs, coil springs, torsion springs, etc. in various known arrangements including walking beam suspension systems, trailing arm suspension systems, etc. Although, in the illustrated example, the rear wheel assembly 106 includes two axle assemblies, the present technology is not limited to use with twin axle rear wheel assemblies, and it is expected that the present technology can be used with virtually any configuration of rear wheel assembly/rear suspension system. For example, embodiments of the present technology can be used with single axle rear wheel assemblies, three axle rear wheel assemblies, etc. Accordingly, it will be appreciated that embodiments of the present technology are not limited to any particular type of transport vehicle, trailer, trailer suspension, wheel assembly, axle arrangement, etc. unless otherwise specified herein and/or unless the context requires otherwise.

In FIG. 1A, the rear wheel assembly 106 is in a forward position F relative to an aft end 114 of the trailer 102. As noted above, the forward position F of the rear wheel assembly 106 may be best for maneuvering the trailer 102 over the road. In FIG. 1B, however, the rear wheel assembly 106 has been moved rearwardly via the track portion 112 to a rear position R that is much closer to the aft end 114 of the trailer 102. In some embodiments, the rear position R can correspond to the rearmost position available to the rear wheel assembly 106 via the track portion 112. As discussed above, this configuration is generally recommended during loading and unloading operations at a loading dock because it reduces the cantilevered configuration of the trailer bed relative to the rear wheel assembly 106. Additionally, in those embodiments in which the rear wheel assembly 106 includes an air ride suspension system, dumping the air in the corresponding air springs can further stabilize the trailer 102 for loading/unloading operations.

As discussed above, in some embodiments the rear wheel assembly 106 can be moved from the forward position F shown in FIG. 1A to the rear position R shown in FIG. 1B in a conventional manner by having the trailer operator unlock the suspension carriage from the track portion 112 (by, e.g., removing corresponding pins from apertures in the chassis frame rails) and applying the wheel brakes. The operator can then drive the tractor 104 forward while the rear wheel assembly 106 remains stationary, thereby causing the trailer 102 to slide on the carriage until the rear wheel assembly 106 is in the rear position R relative to the trailer 102 as shown in FIG. 1B. Once the rear wheel assembly 106 is in the rear position R, the operator can, e.g., reinstall the pins to lock the carriage in position relative to the trailer chassis 116. The foregoing method is provided by way of example of a suitable method for moving the rear wheel assembly 106 from the forward position F to the rear position R relative to the trailer 102. Other suitable methods can be used depending on the trailer configuration and, accordingly, the present technology is not limited to use with any particular method unless otherwise specified herein.

Figure 2:
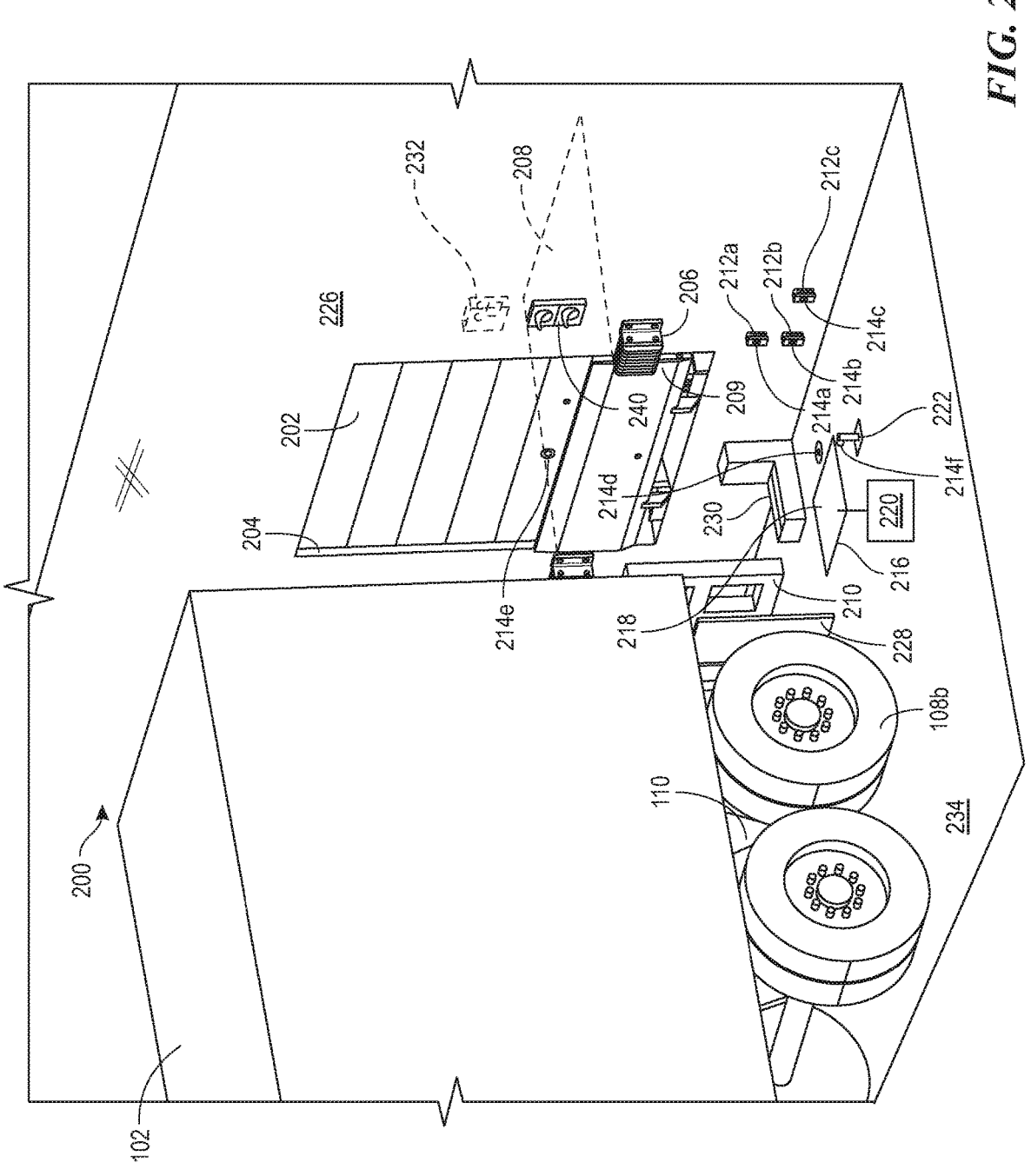
FIG. 2 is an isometric view of a trailer positioned at a loading dock station configured in accordance with embodiments of the present technology.

FIG. 2 is an isometric view of the trailer 102 approaching a loading dock station 200 ("loading dock 200") configured in accordance with embodiments of the present technology. In the illustrated embodiment, the loading dock 200 includes a dock door 202 operably positioned in an opening 204 in a dock wall 226. The dock door 202 can have a plurality of horizontal panels hingedly attached together and configured to retract upwardly to provide access to the interior of the loading dock 200. The loading dock 200 can also include a conventional dock leveler 208 having a dock leveler lip 209 on a distal end portion thereof. The dock leveler 208 can be configured to rotate upwardly about a proximal end portion thereof once the dock door 202 has been raised and then downwardly to extend the dock leveler lip 209 through the opening 204 and onto the bed of the trailer 102 for cargo loading/unloading operations. Dock bumpers 206 can be positioned on opposite sides of the door opening 204 and configured to contact a trailer rear impact guard (RIG) 210 when the trailer 102 is backed fully up to the loading dock wall 226. The loading dock 200 can further include a conventional trailer/vehicle restraint 230 and dock signal lights 240. The vehicle restraint 230 can be positioned on a drive or parking pad 234 in front of the door opening 204 and/or mounted to the dock face directly below the door opening 204. The vehicle restraint 230 can include a mechanical hook or other engagement structure configured to deploy (e.g., upwardly) from a stored position and engage the RIG bar 210 in a conventional manner. This restrains the trailer 102 against or at least directly adjacent to the loading dock 200 and prevents the trailer 102 from moving away from the loading dock 200 during loading and/or unloading operations. The trailer restraint 230 is further configured to retract or otherwise disengage from the RIG bar 210 and release the trailer 102 after the loading/unloading operations so that the trailer 102 can depart the loading dock 200. In other embodiments, the loading dock 200 can include wheel chocks and/or other suitable forms of manual and/or powered trailer restraints in addition to, or in place of, the vehicle restraint 230.

In some embodiments, the loading dock 200 can also include a trailer presence sensor (TPS; not shown) operably positioned on the parking pad 234 and/or a TPS operably positioned on, e.g., an exterior surface of the dock wall 226, the dock door 202, or in any other suitable location. The TPS can include any type of suitable sensor including, for example, an ultrasonic sensor, an optical sensor, an electromagnetic sensor, a contact sensor, a radar sensor, photocell, and/or essentially any sensor capable of detecting the presence of the trailer 102 on the parking pad 234 in front of the loading dock 200. In some embodiments, loading docks can include TPSs to communicate with individual loading dock station controllers (e.g., control panels) and/or broader building management systems to inform them that a transport trailer is present at a particular loading dock station and/or to wake or otherwise activate one or more loading dock systems. Examples of trailer presence sensors may be described in U.S. Pat. Nos. 10,106,342; 10,494,205; 11,256, 264; and 11,262,747; each of which is incorporated herein by reference in its entirety.

In addition to the foregoing features, the loading dock 200 can further include a control panel 232 positioned adjacent to the dock door 202 on an interior side of the dock wall 226. The control panel 232 can include a user interface (e.g., a human-machine interface (HMI)) configured to display information and/or receive user inputs from a dock operator for controlling operation of, e.g., the dock door 202, the trailer restraint 230, the dock leveler 208, the dock signal lights 240, and/or other pieces of dock equipment operably positioned at the loading dock 200 to facilitate loading/unloading operations.

In some embodiments, the loading dock 200 further includes a sensor assembly 212a mounted to a lower portion of the dock wall 226. As described in greater detail below, the sensor assembly 212a can include a sensor 214a (e.g., a proximity sensor, a position sensor, etc.) configured to detect the presence and/or position of the rear trailer wheel 108b and/or an associated mud flap 228 to determine whether the rear wheel assembly 106 (and hence the rear suspension system 110) is in the rear position R relative to the trailer 102 (FIG. 1B) or other suitable rearward position for trailer loading/unloading operations at the loading dock 200. For example, in some embodiments the sensor 214a can be an electro-optical photoelectric sensor configured to detect the presence of an object and/or the distance or distance range between the sensor and the object (e.g., the wheel 108b, the mud flap 228, etc.), such as a Banner S18-2VPDL-Q8 photoelectric sensor or a Banner QS30LV beam sensor, both available from Banner Engineering Corp., 9714 Tenth Avenue North, Minneapolis, Minnesota 55441, USA. In some embodiments, the sensor 214a can be a time of flight (TOF) sensor (e.g., a laser or LED based TOF sensor) capable of detecting an object and determining distances or distance ranges between the sensor and sensed objects; and or a LiDAR sensor or similar type of sensor, camera, etc. for, e.g., 3D mapping and imaging of objects to determine, e.g., placement of objects, distances of objects, size, or orientation etc. By way of example only, such LiDAR sensors can include multiScan 103D LiDAR sensors from SICK, of 6900 West 110th Street, Minneapolis, Minnesota, 55438, USA. In other embodiments, the sensor 214a can further include, for example, a high sensitivity radar sensor using frequency modulated continuous wave (FMCW) radar for detection of moving or stationary targets (e.g., the wheel 108b, the mud flap 228, etc.), 3DLiDAR scanners, 3DTOF sensors. Additional suitable sensor types can include camera sensors, inductive sensors (electromagnetic inductive sensors), etc. In other embodiments, the sensor 214a can include other types of sensors configured to detect the location or position of an object (e.g., the trailer wheel 108b, the mud flap 228, etc.) in the sensor line of sight/field of view and transmit a signal indicating this information to, e.g., the dock control panel 232, a central dock management system, and/or other processing devices.

In some embodiments, the sensor 214a can be positioned on the dock wall 226 at an elevation that is approximately horizontally aligned with the mud flap 228 and with a line-of-sight or field of view projecting perpendicularly, or at least approximately perpendicularly, outward from the dock wall 226 and intersecting the mud flap 228. In other embodiments, the present technology can include other sensors in other locations in addition to, or instead of, the sensor 214a to detect the presence and/or position of the rear wheel 108b, the mud flap 228, the rear suspension system 110, and/or another portion of the rear wheel assembly 106 to determine whether the rear wheel assembly 106 is in the rear position R relative to the trailer 102 (FIG. 1B) or other rearward position suitable for loading/unloading operations at the loading dock 200. For example, in some embodiments the present technology can include a sensor assembly 212b that includes a sensor 214b positioned at a lower elevation than the sensor 214a. (For ease of reference, the sensor assembly 212a and the corresponding sensor 214a may be referred to herein as the "first sensor assembly 212a" and the "first sensor 214a," respectively, the sensor assembly 212b and the corresponding sensor 214b may be referred to herein as the "second sensor assembly 212b" and the "second sensor 214b," respectively, and so on.) As described in greater detail below, in some embodiments, the second sensor 214b can have a line-of-sight or field of view projecting perpendicularly, or at least generally perpendicularly, outward from the dock face dock wall 226 and intersecting the rear trailer wheel 108b. In other embodiments, the present technology can include a third sensor assembly 212c that includes a third sensor 214c positioned laterally adjacent to the second sensor 214b. As described in greater detail below, the third sensor 214c can be directed at an angle (e.g., a non-perpendicular angle) away from the dock wall 226 and directed toward the rear trailer wheel 108b and/or the mud flap 228 when the trailer 102 has been backed fully up to the dock wall 226. Based on the foregoing discussion, will be understood that, in some embodiments the present technology can include a single sensor in any of the locations described above, and in other embodiments the present technology can include multiple sensors in two or more of the locations described above and/or in other suitable locations.

In some embodiments, the present technology can include other sensors for detecting the presence and/or position of the rear wheel assembly 106 and/or the rear suspension system 110 relative to the trailer 102 in addition to, or instead of, one or more of the sensors 214a-c. For example, the loading dock 200 can include a fourth sensor 214d embedded in the parking pad 234 and directed, e.g., upwardly to detect the presence and position of, e.g., the wheel 108b; or a fifth sensor 214e mounted in the dock door 202 and directed outwardly and downwardly to detect the presence and position of the wheel 108b and/or the mud flap 228. Additionally, in some embodiments the loading dock 200 can include a sensor assembly 222 mounted on the parking pad 234 in front of the dock wall 226. The sensor assembly 222 can include a sixth sensor 214f that is mounted on a support that projects slightly above the parking pad 234. The sixth sensor 214f can be directed, e.g., laterally, or horizontally to detect the rear wheel 108b (e.g., the sidewall of the rear wheel 108b). In some embodiments, the sensors 214b-f can be the same in structure and function as the first sensor 214a. In other embodiments, one or more of the sensors 214a-f can be different types of sensors configured to detect the presence and/or position of the rear wheel 108b, the mud flap 228, a portion of the trailer suspension system 110, and/or other portions of the rear wheel assembly 106 to determine or confirm that the rear wheel assembly 106 is in the rear position R relative to the trailer 102 (FIG. 1B).

In other embodiments of the present technology, the loading dock 200 can include other types of sensor systems configured to detect the presence of, e.g., the rear wheel 108b, the mud flap 228, and/or portions of the trailer suspension 110 to confirm that the rear wheel assembly 106 and/or the rear suspension system 110 is in the rear position R relative to the trailer 102 (FIG. 1B). For example, in some embodiments the loading dock 200 can include a sensor 220 (shown schematically) that is operably connected to a platform 218 positioned on the parking pad 234. The platform 218 can be suitably shaped and positioned to receive and support the rear wheel 108b when the trailer 102 is fully backed up to the loading dock 200 and the rear wheel assembly 106 is in the rear position R. In some embodiments, the sensor 220 can be a force or pressure sensor configured to detect the presence of the rear wheel 108b on the platform 218. For example, the sensor 220 can include a strain gauge load cell, a piezoelectric force sensor, a capacitive force sensor, a magnetic force sensor, and optical force sensors, a force sensing resistor, etc. In other embodiments, the sensor 220 can be an ultrasonic sensor, a light sensor, a limit switch, and/or various other types of suitable electrical and/or optical sensors configured to detect the presence of the rear wheel 108b on the platform 218. Although the platform 216 is depicted as having a particular shape (e.g., rectangular, or square) and relative size in FIG. 2 for purposes of illustration, in other embodiments the platform 216 can have other suitable shapes (e.g., round shapes, oval shapes, irregular shapes, etc.) and/or sizes.

Figure 3A:
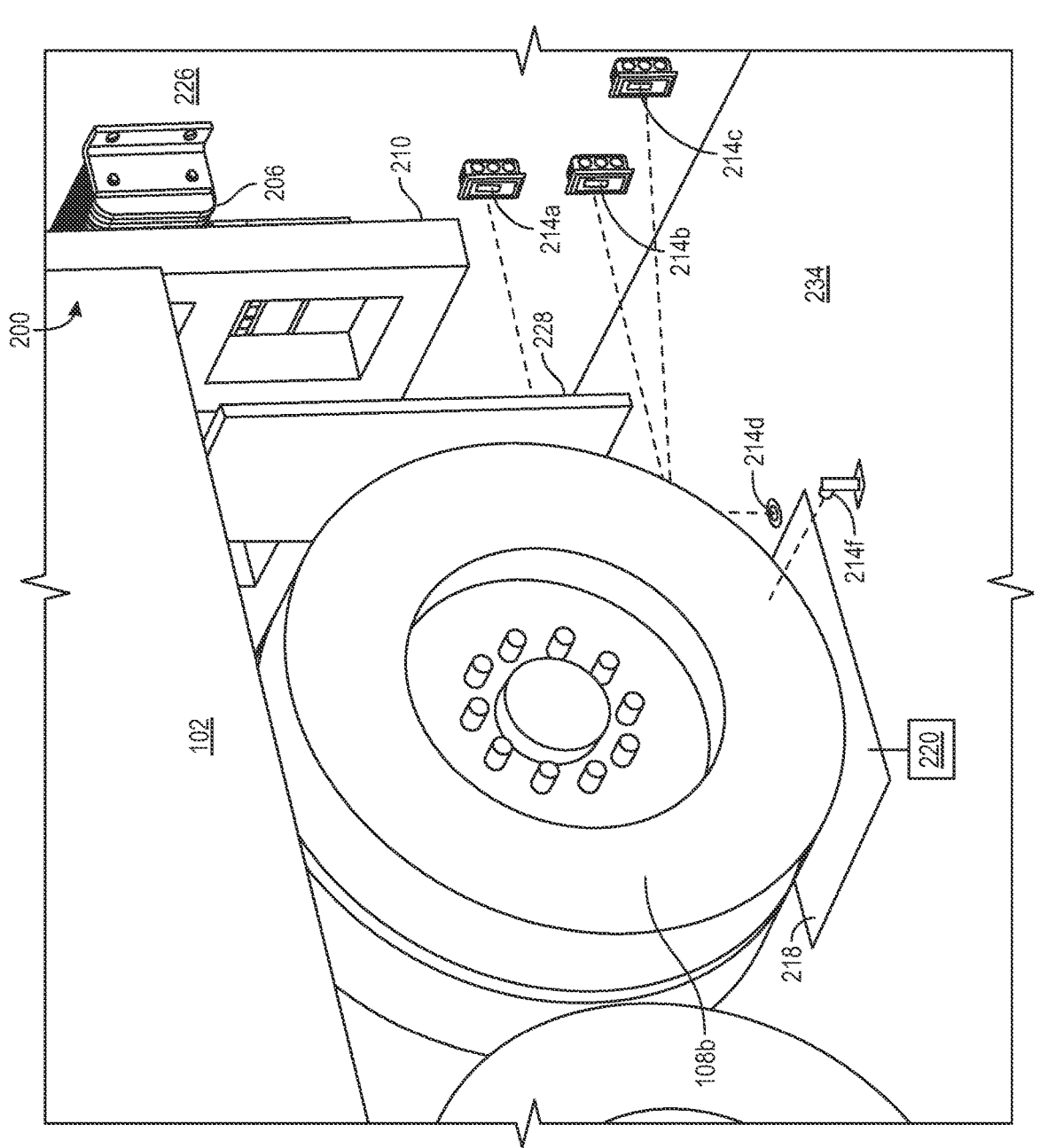
FIGS. 3A and 3B are an isometric view and a side view, respectively, of the trailer of FIG. 2 positioned directly in front of the loading dock station of FIG. 2 in accordance with embodiments of the present technology.
Figure 3B:
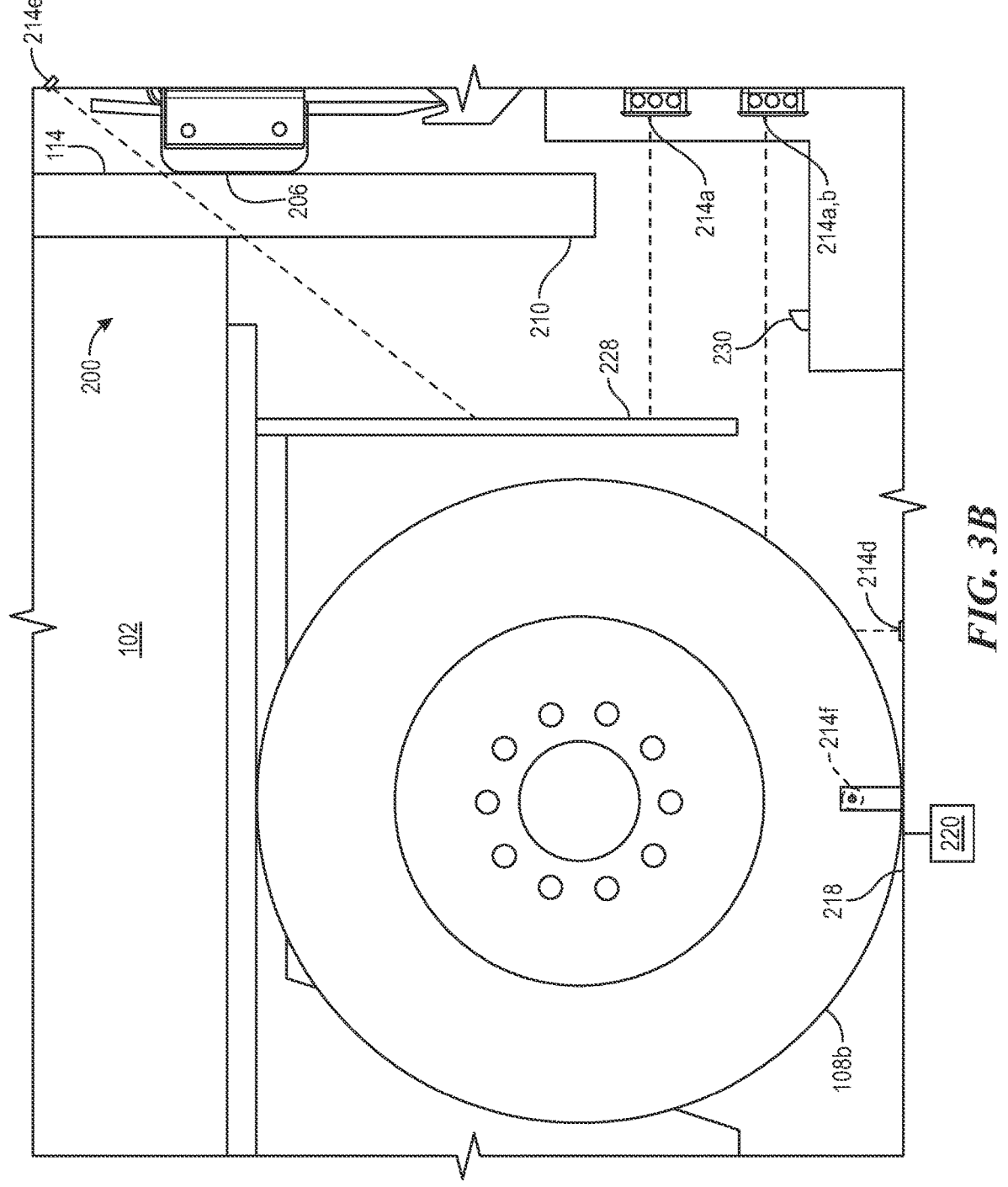

FIGS. 3A and 3B are isometric and side views, respectively, of the trailer 102 positioned at the loading dock 200 in accordance with embodiments of the present technology. In FIGS. 3A and 3B, the trailer 102 is backed fully up to the door opening 204 such that the trailer RIG 210 is contacting, or is at least very close to, the dock bumpers 206 in the position the trailer 102 would typically be in during normal cargo loading/unloading operations. Additionally, the rear wheel assembly 106 is shown in the rear position R (FIG. 1B) in FIGS. 3A and 3B for purposes of illustration. In operation, the sensors 214a-f, 220 can be activated by a signal from, e.g., a TPS or other dock system indicating that the trailer 102 is present at the loading dock 200. In other embodiments, the sensors 214a-f, 220 can be in a persistent active state, or can be manually activated via, e.g., the control panel 232 by a dock operator or other personnel before, after, or as the trailer 102 approaches or is at the loading dock 200.

Referring to FIGS. 3A and 3B together, as discussed above the first sensor 214a is mounted to the dock wall 226 such that the sensor line-of-sight/field of view is directed toward the mud flap 228. Similarly, the second and third sensors 214b and 214c, respectively, can be mounted to the dock wall 226 and positioned so that the respective lines-of-sight/fields of view are directed toward the trailer wheel 108b. As described herein, the sensors 214a-c are configured to detect the presence and/or position of the mud flap 228 and/or the rear wheel 108b, as the case may be, when the trailer 102 is backed up to the dock face. As described above with reference to FIG. 2, the sensors 214a-c are but some examples of suitable embodiments of the present technology. In other embodiments, the loading dock 200 can include the fourth sensor 214d embedded in the parking pad 234 and directed upwardly to detect the presence and/or position of the rear wheel 108b when the rear wheel assembly 106 is at, or at least near, the rear position R (FIG. 1B). Moreover, as illustrated in FIG. 3B, in some embodiments the loading dock 200 can include the fifth sensor 214e mounted to the dock door 202 and directed toward the mud flap 228 and/or the rear wheel 208b. As with the other sensors described above, the sensor 214e can be configured to detect the presence and/or position of the mud flap 228 and/or the rear wheel 208b when the rear wheel assembly 106 is at, or at least near, the rear position R. In yet further embodiments, the loading dock 200 can include the sixth sensor 214f positioned on a support above (e.g., 0.10 inch to 4 inches above, or 0.25 inch to 2 inches above) the parking pad 234 and configured to detect the presence and/or position of the rear wheel 108b when the rear wheel assembly 106 is in the rear position R. For example, the sixth sensor 214f can be oriented so that its line-of-sight or field of view is directed laterally and horizontally, or at least approximately laterally and horizontally, toward the sidewall of the wheel 108b.

For any of the sensors 214a-f described above, the sensor can be configured to detect the presence of an object (e.g., the trailer wheel 108b, the mud flap 228, etc.) and/or the distance of the object from the sensor, and this information can be used by the loading dock system (including, e.g., a processor associated with the control panel 232; FIG. 2) to determine and/or confirm that the rear wheel assembly 106 is in the rearmost position, or within a preset distance of the rearmost position, relative to the aft end 114 of the trailer 102 (FIG. 1B). By way of example, and referring to FIG. 3B, if the trailer 102 is a conventional 48 ft. or 53 ft. long semi-trailer, the mud flap 228 may be located within a distance of, e.g., 1 ft. to 2 ft. from the aft end 114 of the trailer 102 when the rear wheel assembly 106 is in the rear position R (assuming the rear position R is the rearmost position). In such embodiments, the sensor 214a can be configured to detect the mud flap 228 and determine the distance between the mud flap 228 and the sensor 214a at its mounting location on the dock face. If the sensor 214a determines that the mud flap 228 is within a preset distance of the sensor, for example, a preset distance of 3 ft. or less, then the dock system can conclude from this information that the rear wheel assembly 106 is in the rear position R (e.g. the rearmost position), or that the rear wheel assembly 106 is at least sufficiently close to the rear position R (e.g., within a distance of 3 ft. or less, within a distance of 2 ft. or less, or within a distance of 1 ft. or less) to perform loading/unloading operations without excessive vertical movement of the trailer bed. In a similar manner, each of the other sensors 214b-f described above, depending on the mounting position and orientation of the particular sensor 214a-f relative to its target object (e.g., the trailer wheel 108b, the mud flap 228, etc.), can be configured to determine whether the target object is within a preset distance of the sensor mounting location on the dock face 226, parking pad 234, dock door 202, etc. that corresponds to the rear wheel assembly 106 being in the rearmost position, or at least close enough to the rearmost position (e.g., within a distance of 3 ft. or less, within a distance of 2 ft. or less, or within a distance of 1 ft. or less of the rearmost position) to proceed with loading dock operations. It will be understood that the examples and distances described above are provided by way of example only, and other embodiments can utilize other distances depending on the sensor(s) mounting locations and orientations, the configuration of the trailer/cargo vehicle, and/or the configuration of the loading dock, etc. without departing from the present disclosure.

In other embodiments, one or more sensors 214a-f described above can be configured to detect the presence of an object (e.g., the trailer wheel 108b, the mud flap 228, etc.), e.g., within a preset distance of the sensor (or within a preset distance range of the sensor), and this information can be used by the loading dock system (including, e.g., a processor associated with the control panel 232) to determine and/or confirm that the rear wheel assembly 106 is in the rearmost position, or within a preset distance of the rearmost position, relative to the aft end 114 of the trailer 102. For example, assume that (as in the example above) the mud flap 228 is located within a distance of, e.g., 1 ft. to 2 ft. from the aft end 114 of the trailer 102 when the rear wheel assembly 106 is in the rearmost position. In this example, the sensor 214a can be configured to detect the presence of any object in its line of sight that is within, e.g., a preset distance of 3 ft. from the sensor. Accordingly, if the mud flap 228 moves to within 3 ft. of the sensor 214a as the trailer 102 backs up to the dock face, the sensor 214a will detect the mud flap 228 and, based on this information, the dock system can conclude that the rear wheel assembly 106 is in the rear position R (e.g. the rearmost position), or that the rear wheel assembly 106 is at least sufficiently close to the aft end 114 of the trailer 102 that loading/unloading operations can proceed without excessive vertical movement of the trailer bed. Similarly, each of the other sensors 214b-f described above can be configured to detect the presence of the target object (e.g., the trailer wheel 108b, the mud flap 228, etc.), e.g., within a preset distance of the respective sensor, such that detection of the target object by the sensor indicates that the rear wheel assembly 106 is in the rearmost position, or at least close enough to the rearmost position (e.g., within 1 ft. to 3 ft., within 1 ft. to 2 ft., or within 1 ft. or less of the rearmost position) to proceed with loading dock operations. It will be understood that the examples and distances described above are provided by way of example only, and other embodiments can utilize other distances depending on the sensor(s) mounting locations and orientations, the configuration of the trailer/cargo vehicle, and/or the configuration of the loading dock, etc. without departing from the present disclosure.

As discussed above, in some embodiments, one or more of the sensors 214a-f can be configured to detect the presence of a part of the rear wheel assembly 106 and not necessarily a distance to the object, and this information can be used by the dock system to determine or confirm the location of the rear wheel assembly 106 relative to the trailer 102. For example, in some embodiments the sensor 214f can be a beam sensor configured to emit a light beam (e.g., horizontally) toward a corresponding receiver (not shown) on the opposite side of the parking pad 234. When the trailer 102 backs up to the loading dock 200 and an object (e.g., the rear wheel 108b) obstructs the light beam, the receiver detects the absence of the beam and triggers an output signal to the dock system. The dock system can interpret this signal to mean that the rear wheel assembly 106 is in the rear position R and enable dock operations to proceed accordingly.

In addition to the use of photoelectric beam sensors or other types of line-of-sight/field of view position or proximity sensors that detect objects without contacting the objects (e.g., the rear wheel 108b, the mud flap 228, etc.), the loading dock 200 can also include other types of sensors that detect objects by physically contacting the objects, such as limit/contact switches, force sensors, etc. For example, the loading dock 200 can include a limit switch embedded in the parking pad 234 and positioned to be activated by contact with the wheel 108b when the trailer 102 is parked at the loading dock 200 with the rear wheel assembly 106 is in the rearmost position. As described above, in some embodiments the loading dock 200 can include the sensor 220 operably coupled to, e.g., the platform 218 to detect the presence of the rear wheel assembly 108 by detecting the weight of the trailer 102 when the rear wheel 108b is positioned on the platform 218. It will be understood that, although the present disclosure describes various embodiments of sensor systems for detecting and confirming that the rear wheel assembly 106 (and hence the rear suspension system 110) is in the rear position R (or at least close to the rear position R, or at least closer to the aft end 114 of the trailer 102 (FIG. 1A) than the forward position F), various embodiments of the present technology can include other types of suitable sensors and the various sensors described above can be used alone or in combination.

Although some of the embodiments described above refer to determining and/or confirming the position of the rear wheel assembly 106 relative to the rear position R (FIG. 1B), it will be understood that the present technology is equally applicable to determining and/or confirming the position of the rear wheel assembly 106 relative to the aft end 114 of the trailer 102, or relative to the loading dock face 226, the dock door opening 204, the dock leveler 208, and/or other portion of the loading dock. For example, in some embodiments, the systems and methods described herein can be used to determine and/or confirm that the rear wheel assembly 106 is within a distance of, e.g., 6 ft. or less, 5 ft. or less, 4 ft. or less, 3 ft. or less, 2 ft. or less, or 1 ft. or less from the aft end 114 of the trailer 102 when the trailer 102 is parked at the loading dock 200. Similarly, in some embodiments, the systems and methods described herein can be used to determine and/or confirm that the rear wheel assembly 106 is within a distance of, e.g., 7 ft. or less, 6 ft. or less, 5 ft. or less, 4 ft. or less, 3 ft. or less, or 2 ft. or less from the dock face 226 (FIG. 2) when the trailer 102 is parked at the loading dock 200. Accordingly, it will also similarly be understood that determination of the position of the rear wheel assembly 106 relative to, e.g., aft end 114 of the trailer 102, the dock face 226, the door opening 204, etc. can also be used to control operation of one or more pieces of loading dock equipment as described herein.

As described in detail below, if the sensor (e.g., the sensor 214a-f, 220) is unable to detect that the mud flap 228, the rear wheel 108b, and/or other portion of the rear wheel assembly 106 is in the rear position R (FIG. 1B), or within a suitable distance range of the rear position R, the sensor can send a corresponding signal to, e.g., the dock control panel 232 (FIG. 2) indicating that the trailer rear wheel assembly 106 is not in a suitable rearward position. As noted above, if the rear wheel assembly 106 is not in a suitable rearward position, the trailer 102 may be prone to excessive and undesirable vertical movement as cargo is loaded onto and off the trailer bed during loading/unloading operations. Accordingly, in such instances the control panel 232 can respond to the signal by preventing, or at least inhibiting, operation of one or more pieces of the loading dock equipment (e.g., the trailer restraint 230, the dock door 202, and/or the dock leveler 208, etc.) until the rear wheel assembly 106 has been moved to the rear position R, or at least suitably close to the rear position R. Additionally, the control panel 232 can provide a signal to the dock operator (via, e.g., a displayed light, a displayed message, an audible alert, a text message, etc.), to the vehicle operator (via, e.g., the signal lights 240), and/or to a central dock management system indicating that the trailer 102 needs to be moved away from the loading dock 200 and the rear wheel assembly 106 moved to the rear position R before the trailer 102 is repositioned at the loading dock 200. Alternatively, if the sensor does detect the presence of the mud flap 228, the rear wheel 108b, etc. and thereby confirms that the rear wheel assembly 106 is in the rear position R, the sensor can send a corresponding signal to the control panel 232 and the control panel 232 can respond by enabling (or, in some embodiments, automatically initiating) operation of some or all of the loading dock equipment, or an appropriate sequence thereof, for the cargo loading/unloading process.

Although various embodiments of the technology described herein are described in the context of detecting/determining the position of the rear wheel 108b and/or the mud flap 228, in other embodiments, all or some of the sensors described herein, and other sensors configured in accordance with the present technology, can be configured to detect other portions of the rear wheel assembly 106 including, for example, axles, differentials, brakes, portions of the rear suspension system 110 (e.g., beams, air springs, mechanical springs, etc.), etc. Accordingly, it will be understood that embodiments of the sensor systems described herein can detect and confirm that the rear wheel assembly 106 is in the rear position R via detection of the rear wheel 108b, the mud flap 228, the forward wheel 108a, the rear suspension system 110, and/or any other suitable portion of the rear wheel assembly 106.

Figures 4A, 4B:
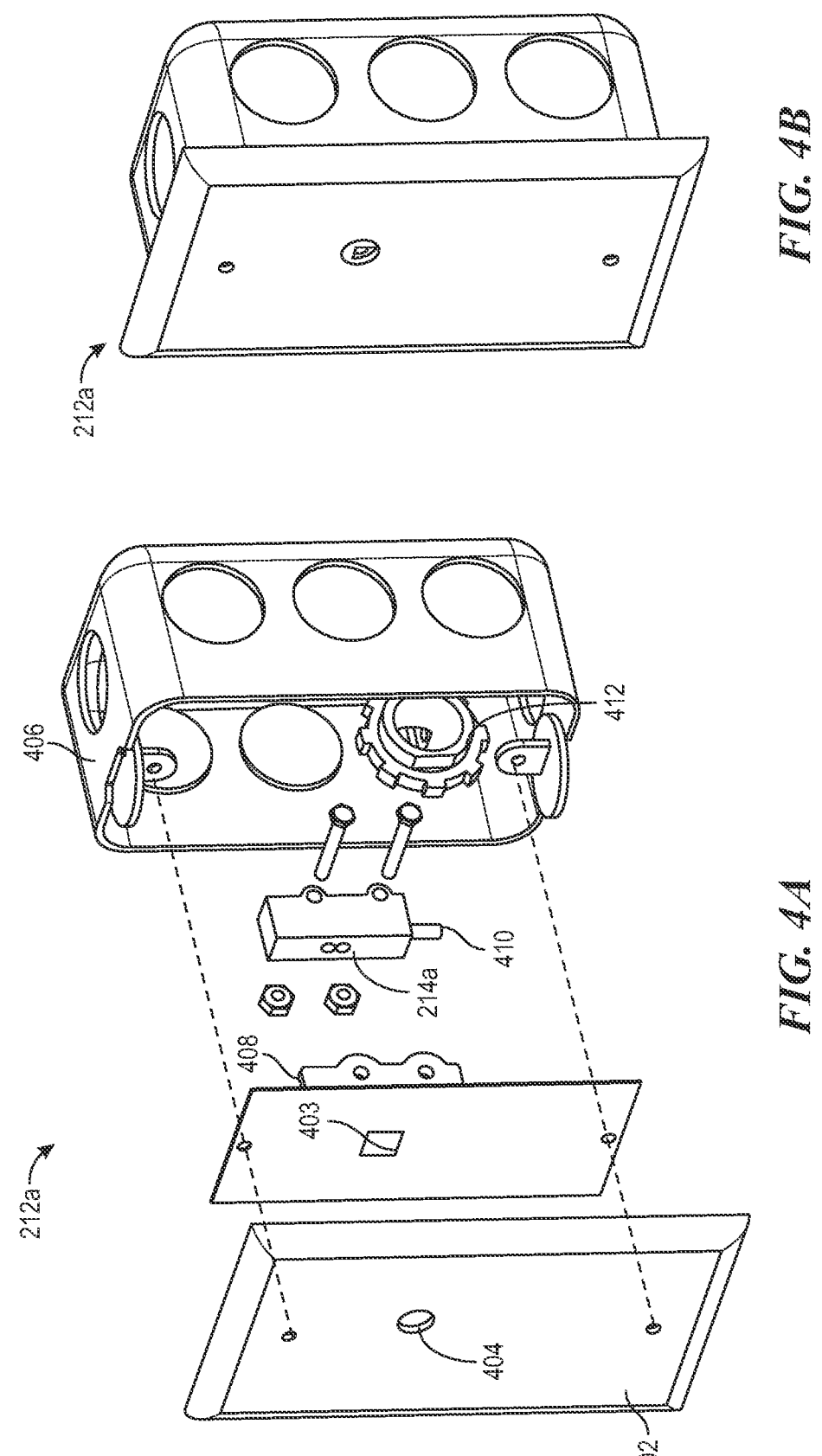
FIGS. 4A and 4B are a partially exploded isometric view and an assembled isometric view, respectively, of a sensor assembly configured in accordance with embodiments of the present technology.

FIG. 4A is a partially exploded isometric view, and FIG. 4B is an assembled isometric view, of the sensor assembly 212a configured in accordance with embodiments of the present technology. Referring first to FIG. 4A, in the illustrated embodiment the sensor assembly 212a includes a cover 402 configured to be attached to a housing 406 with one or more suitable fasteners (e.g., screws). The sensor assembly 212a further includes a bracket 408 configured to be mounted to the backside of the cover 402. The bracket 408 is configured to receive the sensor 214a, which is mounted to the bracket 408 via one or more suitable fasteners (e.g., screws, bolts, etc.) so that the lens of the sensor 214a is directed outwardly through a first aperture 403 in the bracket 408 and a second aperture 404 in the cover 402. An electrical lead 410 (e.g., one or more wires) for providing power to, and/or receiving signals from, the sensor 214a extends from the sensor 214a and can exit the housing 406 via a suitable strain relief 412. FIG. 4B shows the assembled sensor assembly 212a after the sensor 214a has been mounted to the bracket 408 and the cover 402 and bracket 408 have been fastened to the housing 406. It will be understood that the sensor assemblies 212b, c can be the same in structure and function as the sensor assembly 212a described above with reference FIGS. 4A and 4B. Moreover, it will be understood that the sensor assembly 212a of FIGS. 4A and 4B is but one example of a suitable sensor assembly that can be used with various embodiments of the present technology, and the present technology is not limited to this configuration. In other embodiments, sensor assemblies having other suitable configurations can be positioned in the various locations of the loading dock described above without departing from the present disclosure.

Figure 5:
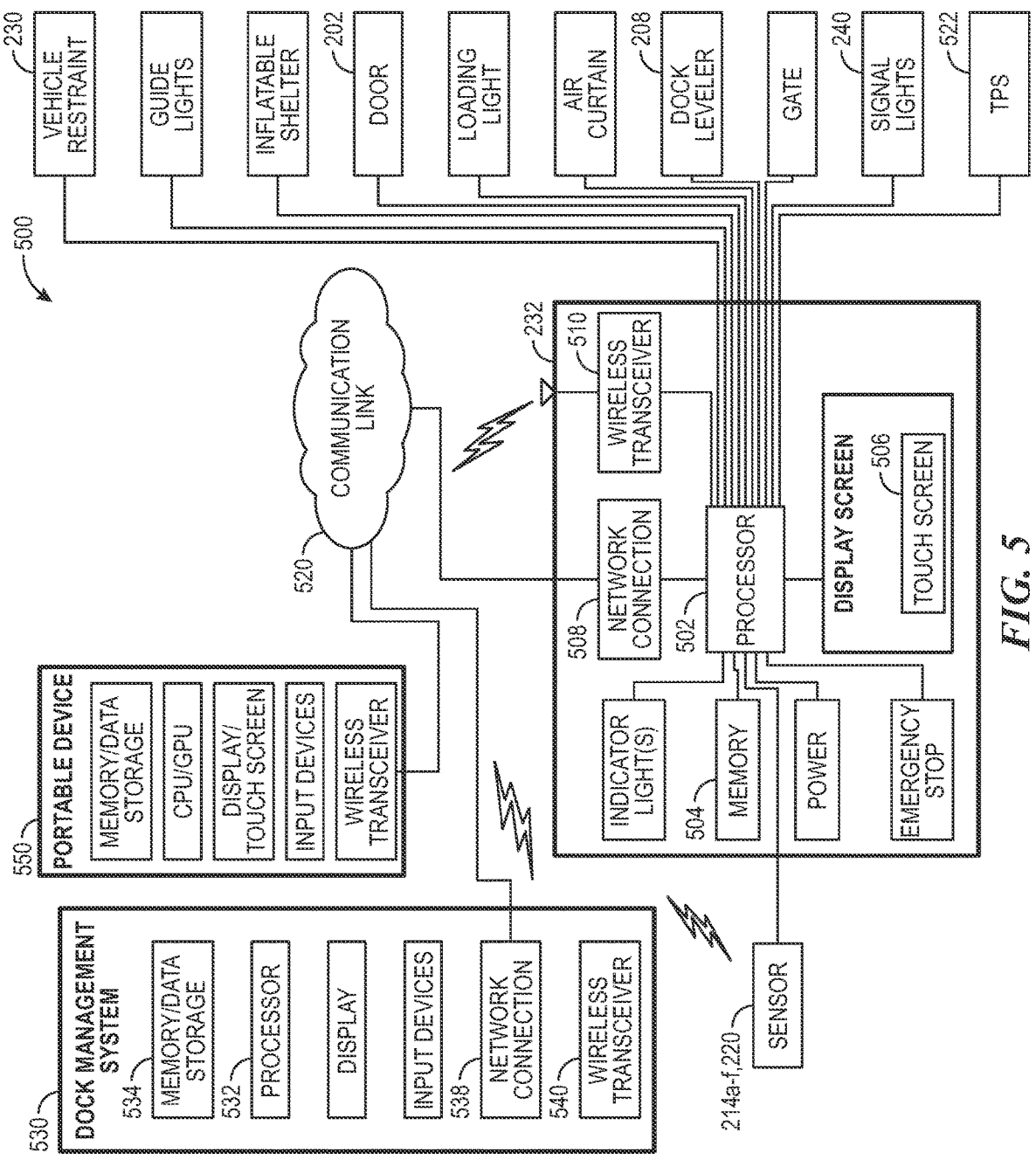
FIG. 5 is a block diagram of a loading dock control system configured in accordance with embodiments of the present technology.

FIG. 5 is a block diagram of a loading dock control system 500 configured in accordance with embodiments of the present technology. In the illustrated embodiment, a sensor (e.g., one or more of the sensors 214a-f, 220) configured to detect the position of the rear wheel assembly 106 relative to the trailer 102 (FIGS. 1A and 1B) is operably connected (e.g., via a wired or wireless connection) to a processor 502 of the control panel 232. The control panel 232 can comprise hardware and/or software components that execute various dock equipment control operations as described in detail herein. For example, the control panel 232 can include one or more user input devices such as a touch screen 506, physical buttons, switches, knobs, etc. that provide user inputs to the processor 502 notifying it of actions. In some embodiments, the touch screen 506 is a portion of a display screen (e.g., a liquid crystal display (LCD) or other display screen) that can provide a graphical user interface (GUI) that provides various information, such as textual and/or graphical information, regarding the system 500 for an individual (e.g., a dock operator) to review and/or respond to when monitoring and managing the loading dock and associated equipment. The actions can be mediated by a hardware controller that interprets the signals received from the input devices and communicates the information to the processor 502 using a suitable communication protocol. The processor 502 may be any suitable logic processing unit, such as one or more programmable logic controllers (PLCs), central processing until (CPUs), digital signal processors (DSPs), application-specific integrated circuits (ASIC), etc. The processor 502 can be coupled to other hardware devices, for example, with use of a bus, such as a USB, PCI bus or a SCSI bus. The processor 502 has access to memory 504 that includes one or more devices for, e.g., volatile and/or non-volatile storage. The memory 504 can include program memory that stores programs and software for executing all or portions of the various methods described herein, as well as an operating system, global application modules, and/or other application programs. The processor 502 can be configured to receive power from, e.g., facility power or a local power source, such as a battery. In some embodiments, the control panel 232 can communicate with other devices (or a server) via wired and/or wireless connections. For example, the control panel 232 can include a wireless transceiver 510 and/or a network connection 508. The wireless transceiver 510 can include a Wi-Fi access point, a Bluetooth transceiver, a near-field communication (NFC) device, and/or wireless modem or cellular radio utilizing suitable technologies for data communications with, e.g., all manner of remote processing devices.

In the illustrated embodiment, the control panel 232 is operably connected to the various pieces of dock equipment described above for operation thereof. For example, the control panel 232 can be operably connected (via, e.g., a wired connection and/or a wireless connection) the vehicle restraint 230, the dock door 202, the dock leveler 208, and the dock signal lights 240. Additionally, in some embodiments the control panel 232 can also be operably connected to other equipment at the loading dock such as, for example, an inflatable shelter or air curtain, guide lights, loading lights, a dock barrier or gate, etc. As will be understood by those of ordinary skill in the art, the dock operator or other authorized personnel can control operation of the loading dock equipment via appropriate user inputs to the control panel 232.

In the illustrated embodiment, the control panel 232 can be operably connected to a dock management system 530 via a communication link 520. In some embodiments, the dock management system 530 can be a central dock management system or facility management system that may be remote from the docking station 200 and operably connected to a plurality of docking stations at the loading dock facility. The dock management system 530 can include one or more processors 532, memory 534 storing executable programs (including, in some embodiments, machine learning programs), a network connection 538 and/or a wireless transceiver 540 for wired and wireless communications with, for example, the control panel 232 (as well as other control panels at the facility) via the communication link 520. In some embodiments, it is also contemplated that the control panel 232 can be operably connected to a portable device 550 via the communication link 520. In some embodiments, the portable device 550 can be, for example, a handheld device (e.g., a tablet, PDA, smartphone, etc.) carried by, e.g., a dock operator, vehicle operator, facility supervisor, etc. Accordingly, the portable device 550 can include suitable memory, one or more processing devices, a display screen, and various user input devices including, e.g., a GUI, a touchscreen, buttons, etc., as well as a wireless transceiver for communicating with e.g., the control panel 232 via the communication link 520. In some embodiments, the control panel 232 can transmit information to the portable device 550 to inform the carrier that, e.g., the rear wheel assembly 106 is not in the rear position R (FIG. 1B) and needs to be moved rearward before performing loading/unloading operations. In some embodiments, the communication link 520, as well as any of the other connections between the entities shown in FIG. 5, can include one or more of the Internet, a local area network (LAN), a wired area network (WAN), and/or other wired or wireless networks.

In some embodiments, the system 500 can operate as follows. As a trailer (e.g., the trailer 102 of FIG. 2) approaches the loading dock 200, the sensor 214*a-f*, 220 can be automatically activated via detection of the approaching trailer by a TPS 522 or manually activated via user input at the control panel 232. Once the trailer 102 is parked directly in front of dock door 202, the sensor 214*a-f*, 220 detects the position of the rear wheel assembly 106 and sends a corresponding signal to the control panel 232. For example, if the sensor 214*a-f*, 220 detects (via, e.g., detection of the rear wheel 108*b*, the mud flap 228, etc.) that the rear wheel assembly 106 is within a preset distance of the dock wall 226 corresponding to the rear wheel assembly 106 being in the rear position R (FIG. 1B), the sensor sends a corresponding signal to the control panel 232 indicating that the rear wheel assembly 106 is in the rear position R. As a result, the control panel 232 initiates, or at least enables, operation of the loading dock equipment accordingly. For example, the control panel 232 can enable (or sequentially cause) engagement of the vehicle restraint 230 with the trailer 102, raising of the dock door 202, and/or installation of the dock leveler 208 onto the trailer bed. In other embodiments, instead of, or in addition to, automatically controlling the loading dock equipment, the control panel 232 can provide an appropriate signal (e.g., a visual or audible signal) and/or a message to the dock operator via, e.g., the display screen indicating that the rear wheel assembly 106 is in the rear position R and enabling the dock operator to proceed with manual operation of the loading dock equipment via the control panel user interface. Conversely, if the signal from the sensor 24*a-f*, 220 indicates that the rear wheel assembly 106 is not in the rear position R (or at least not in another rearward position suitable for stable loading/unloading operations), the control panel 232 can prevent operation of the loading dock equipment and/or send a corresponding signal or message to the dock operator indicating that the rear wheel assembly 106 is not in the rear position R. For example, in some embodiments the control panel 232 can provide such a message to the dock operator via, e.g., the control panel display screen, or the control panel 232 can provide a visible or audible signal or alarm indicating that the rear wheel assembly 106 is not in a suitable location for loading/unloading operations. In other embodiments, the control panel 323 can provide this information to the dock operator via one or more signal lights located in the interior of the loading dock, for example, on a dock wall near the dock door opening 204. Regardless of how the dock operator is notified, the dock operator can respond by instructing the vehicle operator to pull the trailer forward from the loading dock 200 and move the rear wheel assembly 106 aft relative to the bed of the trailer 102 to the rear position R, and then move the trailer 102 back into position in front of the loading dock opening. In some embodiments, the control panel 232 can in addition, or alternatively, send a corresponding signal to the vehicle operator (via, e.g., the dock signal lights 240) when the rear wheel assembly 106 is not in a suitable location for loading/unloading operations, and the vehicle operator can respond to the signal by pulling the trailer 102 forward, moving the rear wheel assembly 106 aft to the rear position R, and then returning to the loading dock. Once the sensor confirms that the rear wheel assembly 106 is in the rear position R (or other suitable rearward position), the control panel 232 can enable, or automatically initiate, operation of the loading dock equipment as described above.

In some embodiments, in addition to communicating the information regarding the rear wheel assembly 106 to the control panel 232, the control panel 232 can also communicate this information to the dock management system 530 and/or to the portable device 550. In some embodiments, the dock management system 530 can respond to the information by displaying the information to a central dock manager who can, for example, respond to the information by manually controlling operation of the loading dock equipment via remote inputs to the control panel 232, or instead by providing instructions to a dock operator present at the dock and/or to the vehicle operator to reposition the rear wheel assembly and then reposition the trailer 102 at the loading dock 200 with the rear wheel assembly in the rear position R. Additionally, in some embodiments, if the rear wheel assembly 106 is not in the rear position R, the loading dock control panel 232 can also send a corresponding signal or message to the portable device 550 to notify, e.g., either a dock operator in possession of the portable device 550 or the trailer operator in possession of the portable device 550, that the rear wheel assembly 106 is not in a suitable position and instructing them to move the rear wheel assembly 106 aft and then return the trailer 102 to the dock with the rear wheel assembly 106 in the rearmost position. The foregoing examples are but a few of the ways in which the dock control system 500 can be implemented to control dock operations based on input from one or more of the sensors 214a-f, 220 described above regarding the position of the rear wheel assembly 106. Accordingly, the present disclosure is not limited to these examples and in other embodiments the dock control system 500 can be used in other advantageous and useful ways without departing from the present disclosure. Moreover, although specific circuitry is described above with reference to FIG. 5, those of ordinary skill in the art will recognize that other circuitry, and conductivity between the various devices and systems described above can be utilized without departing from the present disclosure.

Figure 6:
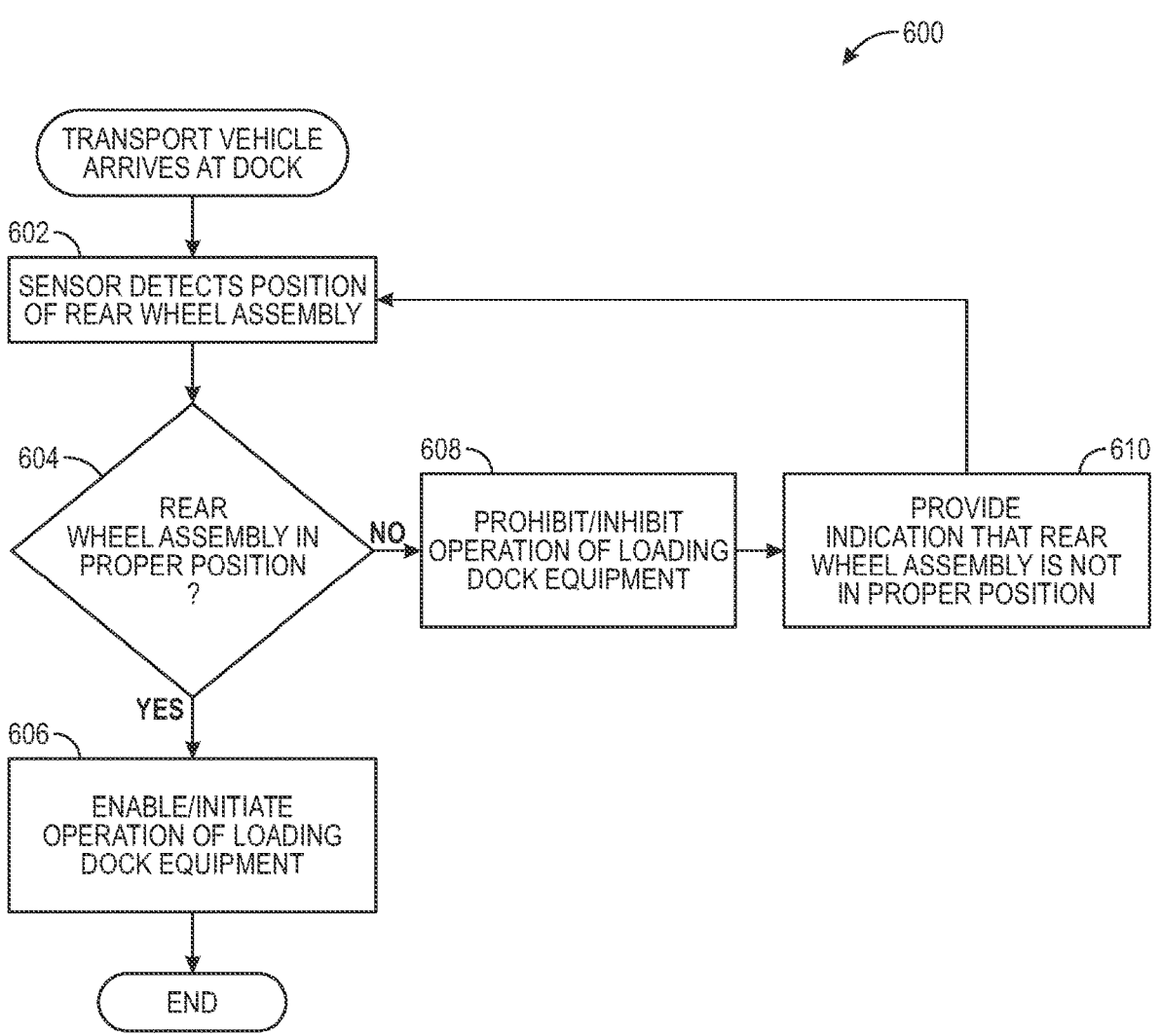
FIG. 6 is a flow diagram of a routine for controlling operation of loading dock equipment in accordance with embodiments of the present technology.

FIG. 6 is a flow diagram of a routine 600 for controlling operation of loading dock equipment based on detection of a trailer rear wheel assembly (e.g., the rear wheel assembly 106; FIG. 1B) relative to a trailer bed (e.g., of the trailer 102), in accordance with embodiments of the present technology. In some embodiments, all or a portion of the routine 600 can be performed by the control panel 232 and/or the dock management system 530 of FIG. 5 in combination with one or more of the sensors 214a-f, 220 in accordance with computer readable instructions stored on non-transitory computer readable media. The routine 600 begins when a transport vehicle, e.g., an over-the-road trailer, arrives at a loading dock and is positioned directly in front of the dock opening as it would be for normal cargo loading/unloading operations. In some embodiments, one or more sensors (e.g., one or more of the sensors 214a-f, 220) is either powered "on" and operable (e.g., "awake") before the transport vehicle arrives at the dock, is activated by, for example, a signal from trailer present sensor or other device as the trailer approaches the loading dock, or is manually activated via e.g., a user input at the control panel 232 before or after the trailer has been positioned at the loading dock. In block 602, the sensor detects the position of the rear wheel assembly of the trailer relative to the aft end of the trailer. As described above, in some embodiments this step can include detecting whether one or more rear wheels and/or a mud flap of the rear wheel assembly is within a preset distance of the sensor, because the distance between the sensor and, e.g., the rear wheel or the mud flap when the trailer is positioned at the loading dock is directly related to the position of the rear wheel assembly relative to the aft end of the trailer (and the position of the rear wheel assembly relative to the dock face). In some embodiments, the sensor can detect the position of the rear wheel assembly by detecting a position of a portion of the rear suspension such as, for example, a rear axle, a rear spring, a portion of an air ride system, etc. relative to the dock face.

After the sensor has detected the position of the rear wheel assembly, the sensor sends a corresponding signal or signals to a processing device (e.g., the processor 502 of the control panel 232 and/or the processor 532 of the dock management system 530, etc.), and in decision block 604 the processing device determines, based on the signal, whether the rear wheel assembly is in a suitable rearward position relative to the trailer (e.g., the rearmost position, or at least within a preset distance of the rearmost position). If not, the routine proceeds to block 608 and prohibits, or at least inhibits (via, e.g., the control panel 232) operation of the loading dock equipment. As discussed above, such operations can include, for example, operation of a vehicle restraint, raising of a loading dock door, and/or deployment of a dock leveler, etc. In block 610, the routine then provides an indication that the rear wheel assembly is not in the proper position. For example, in some embodiments the control panel 232 can provide a textual message or an audible or visual signal that indicates to the dock operator that the rear wheel assembly is not in the rearmost position and, as a result, the dock equipment is inoperable. In some embodiments, the dock operator can either respond to this signal by overriding the control panel and proceeding to operate the loading dock equipment (if, for example, the dock operator has authority to override the control panel), or the dock operator can instruct the vehicle operator to pull the trailer away from the loading dock and move the rear wheel assembly to the rearmost position before returning the trailer to the loading dock for loading/unloading operations.

After the rear wheel assembly has been moved to the rear position and the trailer returned to the loading dock, the routine returns to block 602 and the sensor again detects the position of the rear wheel assembly, after which the routine proceeds to decision block 604 and determines whether the rear wheel assembly is in the proper position. If so, the routine proceeds to block 606 for further loading dock operations. For example, in some embodiments, once the control panel 232 has received confirmation that the rear wheel assembly is in the rearmost position, the control panel 232 can enable or otherwise permit operation of the loading dock equipment via input from the dock operator. As discussed above, this can include restraining the vehicle via the vehicle restraint, raising the dock door, and deploying the dock leveler onto the bed of the trailer. In other embodiments, once the control panel is confirmed that the rear wheel assembly is in the proper position, all or a portion of the subsequent dock operations can be automatically performed by, e.g., the control panel. For example, in some embodiments the control panel 232 can automatically initiate engagement of the trailer via the trailer restraint and subsequent raising of the dock door and/or deployment of the dock leveler. After block 606, the routine ends.

FIG. 6 is a representative flow diagram that depicts processes used in some embodiments. This flow diagram may not show all functions or exchanges of data, but instead provides an understanding of commands and data exchanged under embodiments of the disclosed system. Those skilled in the relevant art will recognize that some functions or exchange of commands and data may be repeated, varied, omitted, or supplemented, and other (less important) aspects not shown may be readily implemented. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Additionally, each of the steps depicted in FIG. 6 can itself include a sequence of operations that need not be described herein. Those of ordinary skill in the art can create source code, microcode, program logic arrays or otherwise implement embodiments the present technology based on the flow diagram of FIG. 6.

Aspects of the present technology can be embodied in a special purpose computer or data processor that is specifically programmed, configured, or constructed to perform one or more of the computer-executable instructions explained in detail herein. While aspects of the present technology, such as certain functions, are described as being performed exclusively on a single device, the present technology can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices.

Aspects of the present technology may be stored or distributed on tangible non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present technology may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). The terms "memory," "computer-readable storage medium," and the like include any combination of temporary, persistent, and/or permanent storage, e.g., ROM, writable memory such as RAM, writable non-volatile memory such as flash memory, hard drives, solid state drives, removable media, and so forth, but do not include a propagating signal per se.

The terminology used herein is to be interpreted in its broadest reasonable manner, even though it is being used in conjunction with a detailed description of certain examples of embodiments of the technology. Indeed, certain terms may even be emphasized herein; however, any terminology intended to be interpreted in any restricted manner will be overtly and specifically defined as such in this Detailed Description section.

Any patents and applications and other references noted above, including any that may be listed in accompanying filing papers, are incorporated herein by reference in the entirety, except for any subject matter disclaimers or disavowals, and except to the extent that the incorporated material is inconsistent with the express disclosure herein, in which case the language in this disclosure controls.

As used herein, the use of relative terminology, such as "about", "generally", "approximately", "substantially" and the like refer to the stated value plus or minus ten percent. For example, the use of the term "about 100" refers to a range of from 90 to 110, inclusive. In instances in which the context requires otherwise and/or relative terminology is used in reference to something that does not include, or is not related to, a numerical value, the terms are given their ordinary meaning to one skilled in the art.

Aspects of the present technology can be modified, if necessary, to employ the systems, functions, and concepts of the various references described above to provide yet further implementations of the present technology.

EXAMPLES

The following examples are illustrative of several embodiments of the present technology:

1. A loading dock, comprising:
   dock wall having a door opening therein;
   a dock door operably positioned in the door opening;
   a parking pad positioned in front of the door opening; and
   a sensor operably mounted to at least one of the dock wall, the dock door, and/or the parking pad, wherein the sensor is configured to detect a presence and/or a position of at least a portion of a rear wheel assembly of a cargo vehicle when the cargo vehicle is positioned at the loading dock.
2. The loading dock of example 1 wherein the sensor is configured to detect a presence of the portion of the rear wheel assembly when the portion of the rear wheel assembly is within a preset distance of the sensor.
3. The loading dock of example 1 wherein the sensor is configured to detect a distance between the sensor and the portion of the rear wheel assembly when the cargo vehicle is positioned at the loading dock.
4. The loading dock of example 1 wherein the sensor is configured to detect the position of the portion of the rear wheel assembly relative to an aft end of the cargo vehicle when the cargo vehicle is positioned at the loading dock.
5. The loading dock of example 1 wherein the sensor is configured to detect the position of the portion of the rear wheel assembly relative to the dock wall, the dock door, and/or another portion of the loading dock when the cargo vehicle is positioned at the loading dock.

6. The loading dock of any of examples 1-5 wherein the portion of the rear wheel assembly includes at least one of a wheel or an associated mud flap of the rear wheel assembly.

7. The loading dock of any of examples 1-6 wherein the rear wheel assembly is movable between a forward position and a rear position relative to the cargo vehicle, and wherein the loading dock further comprises a processing device operably connected to the sensor, wherein the processing device is configured to determine whether the rear wheel assembly has been moved away from the forward position and toward the rear position based on the position of the portion of the rear wheel assembly detected by the sensor.

8. The loading dock of any of examples 1-6 wherein the rear wheel assembly is movable between a forward position and a rear position relative to the cargo vehicle, and wherein the loading dock further comprises a processing device operably connected to the sensor, wherein the processing device is configured to determine whether the rear wheel assembly is within a preset distance of the rear position based on the position of the portion of the rear wheel assembly detected by the sensor.

9. The loading dock of any of examples 1-6 wherein the rear wheel assembly is movable between a forward position and a rear position relative to the cargo vehicle, and wherein the loading dock further comprises a processing device operably connected to the sensor, wherein the processing device is configured to determine whether the rear wheel assembly is in the rear position based on the position of the portion of the rear wheel assembly detected by the sensor.

10. The loading dock of any of examples 1-6, further comprising:

one or more pieces of loading dock equipment operably positioned proximate the door opening; and a controller operably connected to the one or more pieces of loading dock equipment and the sensor, wherein the controller is configured to receive a signal from the sensor related to the position of the portion of the rear wheel assembly, and wherein the controller is further configured to control operation of the one or more pieces of loading dock equipment based on the signal.

11. The loading dock of any of examples 1-6 wherein the rear wheel assembly is movable between a forward position and a rear position relative to the cargo vehicle, and wherein the loading dock further comprises:

one or more pieces of loading dock equipment operably positioned proximate the door opening; and a controller operably connected to the one or more pieces of loading dock equipment and the sensor, wherein the controller is configured to receive a signal from the sensor related to the position of the portion of the rear wheel assembly, and wherein the controller is further configured to prevent or at least inhibit operation of the one or more pieces of loading dock equipment if the signal indicates that the rear wheel assembly is not in, or within a preset distance of, the rear position.

12. The loading dock of any of examples 1-6 wherein the rear wheel assembly is movable between a forward position and a rear position relative to the cargo vehicle, and wherein the loading dock further comprises:

one or more pieces of loading dock equipment operably positioned proximate the door opening; and a control panel positioned adjacent the door opening and operably connected to the sensor and the one or more pieces of loading dock equipment, wherein the control panel includes a user interface configured to receive input from an operator for controlling operation of the one or more pieces of loading dock equipment, wherein the control panel is configured to receive a signal from the sensor related to the position of the portion of the rear wheel assembly, and wherein the control panel is further configured to provide a visual and/or audible indication of a status of the rear wheel assembly to the user in response to receiving the signal.

13. The loading dock of any of examples 1-6 wherein the rear wheel assembly is movable between a forward position and a rear position relative to the cargo vehicle, and wherein the loading dock further comprises:

one or more pieces of loading dock equipment operably positioned proximate the door opening; and a control panel positioned adjacent the door opening and operably connected to the sensor and the one or more pieces of loading dock equipment, wherein the control panel includes a user interface configured to receive input from an operator for controlling operation of the one or more pieces of loading dock equipment, wherein the control panel is configured to receive a signal from the sensor related to the position of the portion of the rear wheel assembly, and wherein the control panel is further configured to provide a visual and/or audible indication of a status of the rear wheel assembly to an operator of the cargo vehicle in response to receiving the signal.

14. The loading dock of any of examples 10-13 wherein the one or more pieces of loading dock equipment includes a vehicle restraint, a dock leveler, and/or the dock door.

15. The loading dock of any of examples 1-14 wherein the sensor is a proximity sensor or a position sensor.

16. The loading dock of any of examples 1-15 wherein the cargo vehicle includes a semi-trailer and the rear wheel assembly includes a tandem axle arrangement mounted to a sliding carriage.

17. A loading dock for use with a cargo vehicle, the cargo vehicle including a rear wheel assembly movably coupled to a cargo bed, the loading dock comprising:

a dock wall having an opening therein;

a parking pad positioned in front of the opening; and a sensor system configured to determine a positional status of the rear wheel assembly relative to at least one of the cargo bed or a portion of the loading dock when the cargo vehicle is positioned on the parking pad in front of the opening.

18. The loading dock of example 17 wherein the sensor system includes one or more sensors operably mounted to one or more portions of the loading dock, and wherein the loading dock further comprises:

one or more pieces of loading dock equipment operably positioned proximate the opening and operable to facilitate loading and/or unloading of cargo from the cargo bed; and a controller operably connected to the one or more pieces of loading dock equipment and the one or more sensors, wherein the one or more sensors configured to detect a presence and/or a position of the rear wheel assembly when the cargo vehicle is positioned on the parking pad in front of the opening, and wherein the controller is configured to control operation of the one or more pieces of loading dock equipment based at least in part on the detected presence and/or position.

19. A method of operating one or more pieces of loading dock equipment at a loading dock, the method comprising:

automatically detecting, by a sensor positioned at the loading dock, a presence and/or a position of at least a portion of a cargo vehicle rear wheel assembly at the loading dock;

if the detected presence and/or position indicates that the rear wheel assembly is within a preset distance of an aft end of the cargo vehicle, enabling operation of the one or more pieces of loading dock equipment; and if the detected presence and/or position indicates that the rear wheel assembly is not within the preset distance of the aft end of the cargo vehicle, preventing or at least inhibiting operation of the one or more pieces of loading dock equipment.

20. The method of example 19, further comprising:

if the detected presence and/or position indicates that the rear wheel assembly is not within the preset distance of the aft end of the cargo vehicle, providing a visual and/or audible signal to an operator at the loading dock and/or at a central dock management system indicating that the rear wheel assembly is not in position for cargo loading/unloading operations.

21. The method of any of examples 19 and 20 wherein the preset distance is 6 ft. or less.

References throughout the foregoing description to features, advantages, or similar language do not imply that all of the features and advantages that may be realized with the present technology should be or are in any single embodiment of the present technology. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment. Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples and embodiments of the present technology is not intended to be exhaustive or to limit the present technology to the precise form disclosed above. While specific examples for the present technology are described above for illustrative purposes, various equivalent modifications are possible within the scope of the present technology, as those skilled in the relevant art will recognize. The teachings of the present technology provided herein can be applied to other systems, not necessarily the system described above.

While the above description describes various embodiments of the present technology and the best mode contemplated, regardless how detailed the above text, the present technology can be practiced in many ways. Details of the system may vary considerably in its specific implementation, while still being encompassed by the present disclosure. As noted above, particular terminology used when describing certain features or aspects of the present technology should not be taken to imply that the terminology is being redefined herein to be restricted to any specific characteristics, features, or aspects of the present technology with which that terminology is associated. In general, the terms used in the following claims should not be construed to limit the present technology to the specific examples disclosed in the specification, unless the above Detailed Description section explicitly defines such terms. Accordingly, the actual scope of the present technology encompasses not only the disclosed examples, but also all equivalent ways of practicing or implementing the present technology under the claims.

From the foregoing, it will be appreciated that specific embodiments of the present technology have been described herein for purposes of illustration, but that various modifications may be made without deviating from the spirit and scope of the various embodiments of the present technology. Further, while various advantages associated with certain embodiments of the present technology have been described above in the context of those embodiments, other embodiments may also exhibit such advantages, and not all embodiments need necessarily exhibit such advantages to fall within the scope of the present technology. Accordingly, the invention is not limited, except as by the appended claims.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A loading dock, comprising:

dock wall having a door opening therein;

a dock door operably positioned in the door opening;

a parking pad positioned in front of the door opening; and a sensor operably mounted to at least one of the dock wall, the dock door, and/or the parking pad, wherein the sensor is configured to detect a position of at least a portion of a rear wheel assembly of a trailer relative to an aft end of the trailer when the trailer is positioned at the loading dock, the trailer is configured to be operably coupled to and positioned by a tractor, and the rear wheel assembly of the trailer is movable between a forward position and a rear position relative to the trailer.

2. The loading dock of claim 1 wherein the sensor is configured to detect a distance between the sensor and the portion of the rear wheel assembly when the trailer is positioned at the loading dock.

3. The loading dock of claim 1 wherein the portion of the rear wheel assembly includes at least one of a wheel or an associated mud flap of the rear wheel assembly.

4. The loading dock of claim 1 wherein the loading dock further comprises a processing device operably connected to the sensor, wherein the processing device is configured to determine whether the rear wheel assembly has been moved away from the forward position and toward the rear position based on the position of the portion of the rear wheel assembly detected by the sensor.

5. The loading dock of claim 1 wherein the loading dock further comprises a processing device operably connected to the sensor, wherein the processing device is configured to determine whether the rear wheel assembly is in the rear position based on the position of the portion of the rear wheel assembly detected by the sensor.

6. The loading dock of claim 1, further comprising:

one or more pieces of loading dock equipment operably positioned proximate the door opening; and a controller operably connected to the one or more pieces of loading dock equipment and the sensor, wherein the controller is configured to receive a signal from the sensor related to the position of the portion of the rear wheel assembly, and wherein the controller is further configured to control operation of the one or more pieces of loading dock equipment based on the signal.

7. The loading dock of claim 1 wherein the loading dock further comprises:

one or more pieces of loading dock equipment operably positioned proximate the door opening; and a controller operably connected to the one or more pieces of loading dock equipment and the sensor, wherein the controller is configured to receive a signal from the sensor related to the position of the portion of the rear wheel assembly, and wherein the controller is further configured to prevent or at least inhibit operation of the one or more pieces of loading dock equipment if the signal indicates that the rear wheel assembly is not in, or within a preset distance of, the rear position.

8. The loading dock of claim 7 wherein the one or more pieces of loading dock equipment includes a vehicle restraint, a dock leveler, and/or the dock door.

9. The loading dock of claim 1 wherein the loading dock further comprises:

one or more pieces of loading dock equipment operably positioned proximate the door opening; and a control panel positioned adjacent the door opening and operably connected to the sensor and the one or more pieces of loading dock equipment, wherein the control panel includes a user interface configured to receive input from an operator for controlling operation of the one or more pieces of loading dock equipment, wherein the control panel is configured to receive a signal from the sensor related to the position of the portion of the rear wheel assembly, and wherein the control panel is further configured to provide a visual and/or audible indication of a status of the rear wheel assembly to a user in response to receiving the signal.

10. The loading dock of claim 1 wherein the loading dock further comprises:

one or more pieces of loading dock equipment operably positioned proximate the door opening; and a control panel positioned adjacent the door opening and operably connected to the sensor and the one or more pieces of loading dock equipment, wherein the control panel includes a user interface configured to receive input from an operator for controlling operation of the one or more pieces of loading dock equipment, wherein the control panel is configured to receive a signal from the sensor related to the position of the portion of the rear wheel assembly, and wherein the control panel is further configured to provide a visual and/or audible indication of a status of the rear wheel assembly to an operator of the tractor in response to receiving the signal.

11. The loading dock of claim 1 wherein the sensor is a proximity sensor or a position sensor.

12. The loading dock of claim 1 wherein the trailer includes a semi-trailer and the rear wheel assembly includes a tandem axle arrangement mounted to a sliding carriage.

13. A loading dock, comprising:

dock wall having a door opening therein;

a dock door operably positioned in the door opening;

a parking pad positioned in front of the door opening; and a sensor operably mounted to at least one of the dock wall, the dock door, and/or the parking pad, wherein the sensor is configured to detect a position of a portion of a rear wheel assembly of a trailer relative to the dock wall, the dock door, and/or another portion of the loading dock when the trailer is positioned at the loading dock, the trailer is configured to be operably coupled to and positioned by a tractor, and the rear wheel assembly of the trailer is movable between a forward position and a rear position relative to the trailer.

14. The loading dock of claim 13 wherein the sensor is configured to detect the position of the portion of the rear wheel assembly when the portion of the rear wheel assembly is within a preset distance of the sensor.

15. The loading dock of claim 13 wherein the loading dock further comprises a processing device operably connected to the sensor, wherein the processing device is configured to determine whether the rear wheel assembly is within a preset distance of the rear position based on the position of the portion of the rear wheel assembly detected by the sensor.

16. A loading dock for use with a cargo vehicle comprising a tractor and a trailer configured to be operably coupled to and positioned by a tractor, the trailer including a rear wheel assembly movable between a forward position and a rear position relative to the trailer, the loading dock comprising:

a dock wall having an opening therein;

a parking pad positioned in front of the opening; and a sensor system configured to determine a position of the rear wheel assembly relative to at least one of (a) an aft end of the trailer when the trailer is positioned on the parking pad in front of the opening or (b) a portion of the loading dock when the trailer is positioned on the parking pad in front of the opening.

17. The loading dock of claim 16 wherein the sensor system includes one or more sensors operably mounted to one or more portions of the loading dock, and wherein the loading dock further comprises:

one or more pieces of loading dock equipment operably positioned proximate the opening and operable to facilitate loading and/or unloading of cargo from the trailer; and a controller operably connected to the one or more pieces of loading dock equipment and the one or more sensors, wherein the one or more sensors are configured to detect the position of the rear wheel assembly when the trailer is positioned on the parking pad in front of the opening, and wherein the controller is configured to control operation of the one or more pieces of loading dock equipment based at least in part on the detected presence and/or position.

18. A method of operating one or more pieces of loading dock equipment at a loading dock, the method comprising:

automatically detecting, by a sensor positioned at the loading dock, a position of at least a portion of a rear wheel assembly of a trailer positioned at the loading dock relative to an aft end of the trailer, wherein the trailer is configured to be operably coupled to and positioned by a tractor, and wherein the rear wheel assembly of the trailer is movable between a forward position and a rear position relative to the trailer;

if the position indicates that the rear wheel assembly is within a preset distance of the aft end of the trailer, enabling operation of the one or more pieces of loading dock equipment; and if the detected position indicates that the rear wheel assembly is not within the preset distance of the aft end of the trailer, preventing or at least inhibiting operation of the one or more pieces of loading dock equipment.

19. The method of claim 18, further comprising:

if the detected position indicates that the rear wheel assembly is not within the preset distance of the aft end of the trailer, providing a visual and/or audible signal to an operator at the loading dock and/or at a central dock management system indicating that the rear wheel assembly is not in position for cargo loading/unloading operations.

20. The method of claim 18 wherein the preset distance is 6 ft. or less.

* * * * *